(12) United States Patent
Toyosawa et al.

(10) Patent No.: US 12,365,050 B2
(45) Date of Patent: Jul. 22, 2025

(54) LASER IRRADIATION DEVICE, LASER IRRADIATION SYSTEM, AND METHOD FOR REMOVING COATING OR ADHERING MATTER

(71) Applicant: TOYOKOH Co., Ltd., Fuji (JP)

(72) Inventors: Hiroyasu Toyosawa, Fuji (JP);
Kazuaki Toyosawa, Fuji (JP);
Kazuhisa Fujita, Hamamatsu (JP);
Shinichiro Okihara, Hamamatsu (JP)

(73) Assignee: TOYOKOH Co., Ltd., Fuji (JP)

( * ) Notice: Subject to any disclaimer, the term of this patent is extended or adjusted under 35 U.S.C. 154(b) by 904 days.

(21) Appl. No.: 17/464,632

(22) Filed: Sep. 1, 2021

(65) Prior Publication Data

US 2021/0394308 A1 Dec. 23, 2021

Related U.S. Application Data

(63) Continuation of application No. 15/828,909, filed on Dec. 1, 2017, now Pat. No. 11,135,681, which is a
(Continued)

(30) Foreign Application Priority Data

Mar. 9, 2012 (JP) .................................. 2012-053675

(51) Int. Cl.
*B23K 26/36* (2014.01)
*B01J 19/12* (2006.01)
(Continued)

(52) U.S. Cl.
CPC ............... *B23K 26/36* (2013.01); *B01J 19/12* (2013.01); *B08B 7/0035* (2013.01); *B23K 26/00* (2013.01);
(Continued)

(58) Field of Classification Search
CPC .... B23K 9/046; B23K 2103/56; B23K 26/00; B23K 26/0006; B23K 26/037;
(Continued)

(56) References Cited

U.S. PATENT DOCUMENTS 4,218,689 A 8/1980 Bloom
4,563,565 A 1/1986 Kampfer et al.
(Continued)

FOREIGN PATENT DOCUMENTS

CA 2125678 7/1993
DE 3505449 8/1985
(Continued)

OTHER PUBLICATIONS

Buchter, E. (2010) "*Highlight—das cleanMAGAZIN,*" cleanLASER 1:6-7.
(Continued)

*Primary Examiner* — Steven W Crabb
*Assistant Examiner* — Ket D Dang
(74) *Attorney, Agent, or Firm* — MEDLER FERRO WOODHOUSE & MILLS PLLC

(57) ABSTRACT

In order to provide a laser irradiation system, a method for removing a coating, and a laser irradiation apparatus capable of efficiently removing a coating on a surface of a structure and recovering the removed substance using suction, a laser head (3) is configured from an optical system (4) for irradiating laser beam (30), a suctioning means (33) for suctioning removed matter (60) produced at the point where the laser beam (30) is directed, and an attachment (5) configured to be capable of abutting a surface (20) of a structure, the optical system (4) being operated to scan the irradiation point of the laser beam so as to draw a trajectory
(Continued)

of a circle having a radius r1 around the optical axis of the laser beam (30) on a surface substantially perpendicular to the optical axis.

22 Claims, 16 Drawing Sheets

Related U.S. Application Data continuation of application No. 14/379,646, filed as application No. PCT/JP2013/056476 on Mar. 8, 2013, now Pat. No. 9,868,179.

(51) Int. Cl.

| | |
|---|---|
| *B08B 7/00* | (2006.01) |
| *B23K 26/00* | (2014.01) |
| *B23K 26/035* | (2014.01) |
| *B23K 26/04* | (2014.01) |
| *B23K 26/06* | (2014.01) |
| *B23K 26/064* | (2014.01) |
| *B23K 26/08* | (2014.01) |
| *B23K 26/082* | (2014.01) |
| *B23K 26/14* | (2014.01) |
| *B23K 26/16* | (2006.01) |
| *B23K 26/402* | (2014.01) |
| *B23K 103/00* | (2006.01) |

(52) U.S. Cl.
CPC ........ *B23K 26/0006* (2013.01); *B23K 26/037* (2015.10); *B23K 26/04* (2013.01); *B23K 26/06* (2013.01); *B23K 26/064* (2015.10); *B23K 26/08* (2013.01); *B23K 26/082* (2015.10); *B23K 26/0869* (2013.01); *B23K 26/14* (2013.01); *B23K 26/16* (2013.01); *B23K 26/402* (2013.01); *B23K 2103/56* (2018.08)

(58) Field of Classification Search
CPC ...... B23K 26/04; B23K 26/06; B23K 26/064; B23K 26/08; B23K 26/082; B23K 26/0869; B23K 26/14; B23K 26/16; B23K 26/36; B23K 26/402; B01J 19/12; B08B 7/0035; Y02E 30/30
USPC .................................................... 219/121.73
See application file for complete search history.

(56) References Cited

U.S. PATENT DOCUMENTS

| | | | |
|---|---|---|---|
| 4,756,765 A | 7/1988 | Woodroffe | |
| 5,302,802 A | 4/1994 | Fujinaga et al. | |
| 5,444,213 A | 8/1995 | Honda et al. | |
| 5,622,567 A * | 4/1997 | Kojima | C23C 14/3471 |
| | | | 427/596 |
| 5,670,064 A | 9/1997 | Nakata | |
| 5,705,785 A | 1/1998 | Dykhno et al. | |
| 5,864,114 A * | 1/1999 | Fukuda | B23K 26/032 |
| | | | 219/121.69 |
| 5,986,234 A | 11/1999 | Matthews et al. | |
| 6,144,010 A | 11/2000 | Tsunemi et al. | |
| 6,172,323 B1 | 1/2001 | Ishide et al. | |
| 6,333,485 B1 | 12/2001 | Haight et al. | |
| 6,426,480 B1 | 7/2002 | Troitski | |
| 7,009,141 B1 | 3/2006 | Wool et al. | |
| 7,326,878 B2 | 2/2008 | Odanaka et al. | |
| 7,456,370 B2 | 11/2008 | Beeson et al. | |
| 7,633,033 B2 | 12/2009 | Thomas et al. | |
| 8,759,711 B2 | 6/2014 | Wollmann et al. | |
| 9,089,928 B2 * | 7/2015 | Zediker | B23K 26/0096 |
| 9,868,179 B2 | 1/2018 | Toyosawa et al. | |
| 2001/0041228 A1 | 11/2001 | Ronge et al. | |
| 2005/0064682 A1 | 3/2005 | Anderson | |
| 2005/0184156 A1 | 8/2005 | Otsuki et al. | |
| 2007/0062919 A1 | 3/2007 | Hamada et al. | |
| 2010/0200552 A1 | 8/2010 | Mienhardt | |
| 2010/0258539 A1 | 10/2010 | Sakamoto | |
| 2010/0326138 A1 | 12/2010 | Kumatani et al. | |
| 2011/0049114 A1 | 3/2011 | Barkhausen et al. | |
| 2013/0319984 A1 * | 12/2013 | Linyaev | B23K 26/106 |
| | | | 219/121.72 |

FOREIGN PATENT DOCUMENTS

| | | | |
|---|---|---|---|
| DE | 4413158 | 10/1995 | |
| DE | 19519150 A1 * | 12/1996 | ............. B08B 15/04 |
| DE | 19821211 | 11/1998 | |
| DE | 19900910 | 7/2000 | |
| DE | 10113494 | 10/2002 | |
| DE | 102010026107 | 1/2012 | |
| EP | 2322311 | 5/2011 | |
| JP | 05-115988 | 5/1993 | |
| JP | 05-305463 | 11/1993 | |
| JP | 06-063777 | 3/1994 | |
| JP | 06-142952 | 5/1994 | |
| JP | 06-226473 | 8/1994 | |
| JP | 08-112683 | 5/1996 | |
| JP | 09-010968 | 1/1997 | |
| JP | 09-047888 | 2/1997 | |
| JP | 10-002723 | 1/1998 | |
| JP | 10-050893 | 2/1998 | |
| JP | 10-180479 | 7/1998 | |
| JP | 10-202377 | 8/1998 | |
| JP | 10-216979 | 8/1998 | |
| JP | 10-309899 | 11/1998 | |
| JP | 11-019785 | 1/1999 | |
| JP | 11-147192 | 6/1999 | |
| JP | 11-300491 | 11/1999 | |
| JP | 2000-000538 | 1/2000 | |
| JP | 2000-061699 | 2/2000 | |
| JP | 2001-059892 | 3/2001 | |
| JP | 2002-001563 | 1/2002 | |
| JP | 2002-103076 | 4/2002 | |
| JP | 2003-117672 | 4/2003 | |
| JP | 2003-251484 | 9/2003 | |
| JP | 2003-285171 | 10/2003 | |
| JP | 2003-295083 | 10/2003 | |
| JP | 2003-340581 | 12/2003 | |
| JP | 2005-081399 | 3/2005 | |
| JP | 2005-211977 | 8/2005 | |
| JP | 2005-230318 | 9/2005 | |
| JP | 2005-234215 | 9/2005 | |
| JP | 3695834 B2 * | 9/2005 | |
| JP | 2006-312197 | 11/2006 | |
| JP | 2007-014990 | 1/2007 | |
| JP | 2007-061856 | 3/2007 | |
| JP | 2007-069249 | 3/2007 | |
| JP | 2007-105607 | 4/2007 | |
| JP | 2007-511368 | 5/2007 | |
| JP | 2007-517674 | 7/2007 | |
| JP | 2007-253179 | 10/2007 | |
| JP | 2008-060167 | 3/2008 | |
| JP | 2008-068313 | 3/2008 | |
| JP | 2008-509819 | 4/2008 | |
| JP | 2008-100232 | 5/2008 | |
| JP | 2008-110348 | 5/2008 | |
| JP | 2009-025995 | 2/2009 | |
| JP | 2009-139682 | 6/2009 | |
| JP | 2009-285674 | 12/2009 | |
| JP | 2009-291811 | 12/2009 | |
| JP | 2010-125489 | 6/2010 | |
| JP | 2010-139693 | 6/2010 | |
| JP | 2010-142846 | 7/2010 | |
| JP | 2010-142878 | 7/2010 | |
| JP | 2010-184245 | 8/2010 | |
| JP | 2010-194560 | 9/2010 | |
| JP | 2010-240674 | 10/2010 | |
| JP | 2010-253498 | 11/2010 | |
| JP | 2011-011212 | 1/2011 | |
| JP | 2011-025272 | 2/2011 | |
| JP | 2011-025304 | 2/2011 | |

(56) References Cited

FOREIGN PATENT DOCUMENTS

| | | |
|---|---|---|
| JP | 2011-045892 | 3/2011 |
| JP | 2011-083814 | 4/2011 |
| JP | 2011-147965 | 8/2011 |
| JP | 2011-167704 | 9/2011 |
| JP | 2011-224624 | 11/2011 |
| JP | 2012-017231 | 1/2012 |
| JP | 2012-030251 | 2/2012 |
| JP | 2012-035307 | 2/2012 |
| JP | 2012-047844 | 3/2012 |
| WO | WO 2004/101213 | 11/2004 |
| WO | WO 2005/070093 | 8/2005 |
| WO | WO 2006/031351 | 3/2006 |
| WO | WO 2008/053915 | 5/2008 |
| WO | WO 2009/005840 | 1/2009 |
| WO | WO 2011/013449 | 2/2011 |

OTHER PUBLICATIONS

Extended European Search Report EP 13758038.7 (PCT/JP2013/056476) (2015) 10 pages.
Notification of Reasons for Refusal, Japanese Patent Application No. 2014-128435 (Mar. 29, 2016) (14 pages).
Notification of Reasons for Refusal, Japanese Patent Application No. 2016-238869 (Sep. 5, 2017) (9 pages).
Notice of Reasons for Refusal, Japanese Patent Application No. 2019-035179 (Mar. 10, 2020) (5 pages).

* cited by examiner (A)

(B)

LASER IRRADIATION DEVICE, LASER IRRADIATION SYSTEM, AND METHOD FOR REMOVING COATING OR ADHERING MATTER

CROSS REFERENCE TO RELATED APPLICATIONS AND CLAIM TO PRIORITY

This application is a continuation of U.S. patent application Ser. No. 15/828,909, filed Dec. 1, 2017, which is a continuation of U.S. patent application Ser. No. 14/379,646, filed Nov. 21, 2014, which is a national stage application of International Application No. PCT/JP2013/056476, filed Mar. 8, 2013, which claims priority to Japanese Patent Application No. 2012-053675, filed Mar. 9, 2012, which applications are herein incorporated by reference in their entireties and to which priority is claimed.

TECHNICAL FIELD

The present invention relates to a technology for removing a coating on a surface of a structure by laser irradiation and for suctioning/collecting the removed matter and particularly to a laser irradiation apparatus for removing the coating or the adhering matter by irradiating a laser beam using a portable laser head to a fixed or large structure such as a bridge, a building, a boat, a pipeline and the like as a structure, a laser irradiation system, and a method for removing a coating or adhering matter using such apparatus and system.

BACKGROUND OF THE INVENTION

In order to use the structures safely for a long time which are difficult to be moved such as a bridge, an express way, an elevated track for a railway, a building, a tank, a machine facility and the like, a coating of painting applied on a surface of a base material (steel material) needs to be periodically peeled off, removed, and re-painted in order to prevent corrosion. As a prior-art method for removing a coating, there were a method by blast treatment such as sandblast for removing a coating by blowing sand, a method of using a coating remover, and a method of using a mechanical tool. In the method by blast treatment, a large quantity of secondary waste is generated. This secondary waste is a mixture of a powder dust of a coating containing harmful matters such as lead, chromium hexavalent, PCB and the like and an abrasive material such as silica sand, garnet and the like, which gives a large load to the environment and requires a large treatment cost. Moreover, since the abrasive material is blown by compressed air, there is a concern that even the base material under a coating layer is damaged. Moreover, there is also a problem of a large noise caused at collision of the abrasive material. The methods of using a coating remover and the mechanical tool, they both have a problem that a treatment area per time is small, which is not efficient, and each has problems that a waste of the agents is generated and the noise is large.

Patent Literature 1 discloses a method of removing a coating by a laser treatment apparatus in order to improve working efficiency and to avoid a risk against the prior coating removal of an outer plate of such as an aircraft fuselage by blowing a highly toxic drug to the coating surface and scraping off the coating film by a manual work. The laser treatment apparatus described in Patent Literature 1 includes a lens for irradiating a laser beam to a surface of a treatment target, a lens supporting mechanism which supports the lens and can adjust a height from the treatment target surface to the lens, and a gas injecting means for blowing gas to a laser irradiation portion. Moreover, it is described that a gas inlet arranged in a box-shaped vessel exhausts the gas in the box-shaped vessel and exhausts the removed matter scattered from the laser irradiation portion. It is also described that a sweeping process for sweeping an irradiation position of the laser beam to a first direction by using a first deflector arranged in an optical path of the laser beam incident to the lens and moving the irradiation position of the laser beam in the first direction within the surface of the treatment target by changing a traveling direction of the laser beam and a second deflector arranged in the optical path of the laser beam incident to the lens and moving the irradiation position of the laser beam in a second direction crossing the first direction within the surface of the treatment target by changing the traveling direction of the laser beam is performed a plurality of times while shifting in the second direction crossing the first direction. It is described that, in such a laser treatment apparatus, a laser irradiation head is mounted on a tip-end of a manipulator arm, and the manipulator arm is controlled by a manipulator body and moves and supports the laser irradiation head to a desired position on the surface of the treatment target.

PATENT LITERATURE

Patent Literature 1: Japanese Patent Laid-Open No. 10-309899

SUMMARY OF THE INVENTION

Technical Problem

According to the technology described in Patent Literature 1, the coating film on the surface of the treatment target can be removed by laser abrasion without using chemical products, and the removed matter scattered from the surface of the treatment target can be collected and exhausted by using a gas suctioning means.

However, since the laser irradiation head described in Patent Literature 1 is supported by the manipulator arm and moved to the desired position, it is difficult to be used in an environment in which a sufficient work space cannot be ensured or for a structure having a complicated shape. Moreover, it is also difficult to be carried and handled by a worker. To begin with, the laser treatment apparatus described in Patent Literature 1 is a laser treatment apparatus to be applied to coating removal of such as an aircraft stored in a plant and the like, and movement of such laser treatment apparatus itself is not considered. That is, the coating removing method described in Patent Literature 1 cannot be applied to coating removal of a structure that cannot be moved easily (such as a bridge, and an expressway, an elevated track for a railway, a building and the like, for example).

Moreover, in Patent Literature 1, the first deflector such as a galvano mirror, a polygon mirror and the like for a scanning optical system is used so as to linearly scan the irradiation position of the laser beam (hereinafter referred to as linear scanning). With the method of repeating such linear scanning, it is difficult to efficiently treat a wide range in a short time, and the surface of a wide range of a structure such as a bridge cannot be treated with a low cost. Moreover, in the linear scanning with the laser beam, since its optical path length is changed and a relative distance between a focal point of the laser beam and an actual irradiation point is changed, uniform coating removal could not be performed. Note that a complicated mechanism is required for control of the focal point of the laser beam in accordance with the change in the optical path length by linear scanning with the laser beam. Moreover, if return light of reflection of the laser beam irradiated to the coating surface enters into the laser mechanism, there is a possibility that a fiber or the like is damaged. A complicated mechanism is usually needed in order to prevent damage by the return light, but it is difficult to provide such a mechanism in a portable small-sized laser head. Furthermore, in Patent Literature 1, the removed matter scattered from the surface of the treatment target is collected by the suctioning means, but there is a concern that a part of the removed matter generated from the laser irradiation point adheres to the scanning optical system, and in this case, not only that energy of the laser beam is damped but also, a temperature of the adhesion spot is raised by the laser beam, and the optical system might be broken.

The present invention has an object to provide a laser irradiation apparatus and a laser irradiation system including a small-sized and light-weighted laser head that can solve at least a part of the above-described problems.

Solution to the Problems

In order to solve the above-described problems, a laser irradiation apparatus of the present invention includes a laser oscillator, a fiber for transmitting a laser beam outputted from the laser oscillator, and a portable laser head for focusing the laser beam transmitted via the fiber and irradiating it to a surface of a structure, in which the laser head includes an optical system for irradiating the laser beam and a shielding member for protecting the optical system from a removed matter generated from an irradiation point of the laser beam, and the optical system scans the irradiation point of the laser beam on a surface substantially perpendicular to an optical axis of the laser beam so as to draw a trajectory of a circle having a radius r around the optical axis.

In the laser irradiation apparatus, it is preferable that the optical system has a first wedge prism for deflecting the laser beam to a direction going outward from the optical axis, a second wedge prism for deflecting the laser beam deflected by the first wedge prism to a direction of the optical axis, and a driving means for rotating the first wedge prism and the second wedge prism together around the optical axis, and the shielding member is mounted on a tip-end of the laser head and has an emitting port through which the laser beam is passed on the optical axis. Moreover, a suction source and a suctioning means for suctioning a removed matter generated from the irradiation point of the laser beam may be provided. The laser head may include an attachment configured to be capable of abutting on the surface of the structure.

A laser irradiation apparatus of the present invention includes a laser oscillator, a fiber for transmitting a laser beam outputted from the laser oscillator, a suction source and a portable laser head for focusing the laser beam transmitted via the fiber and irradiating it to a surface of a structure, in which the laser head includes an optical system for irradiating the laser beam, a suctioning means for suctioning a removed matter generated from the irradiation point of the laser beam and an attachment configured to be capable of abutting on the surface of the structure, and the optical system is configured to scan the irradiation point of the laser beam on a surface substantially perpendicular to an optical axis of the laser beam so as to draw a trajectory of a circle having a radius r around the optical axis.

In the laser irradiation apparatus, the attachment is preferably configured such that the surface of the structure is arranged at a distance equal to or closer than a focal distance of the laser beam when abutting on the surface of the structure. Moreover, it is preferable that the optical system has a variable focusing mechanism, the laser head has a distance sensor for measuring an inter-surface distance from a principal point of the optical system to the surface of the structure, and a control unit for changing the focal distance of the laser beam by the variable focusing mechanism of the optical system so as to be the same as the inter-surface distance measured by the distance sensor or longer than that is provided. Moreover, the surface of the structure is preferably arranged within a range of −5 to −25 mm closer to the laser head side than the focal point of the laser beam.

In the laser irradiation apparatus, it is preferable that the laser head has a sensor for detecting abutting or approaching of the attachment to the surface, and a control unit for limiting irradiation of the laser beam is provided if abutting or approaching of the attachment to the surface is not detected by the sensor. Moreover, it is preferable that the laser head has a vibration sensor for detecting vibration and a vibrating means, and a control unit for vibrating the laser head by the vibrating means if vibration detected by the vibration sensor is smaller than a predetermined threshold value is provided.

In the above-described laser irradiation apparatus, the optical system preferably has a first wedge prism for deflecting the laser beam with respect to the optical axis, and a driving means for rotating the first wedge prism and a shielding member arranged between the first wedge prism and the surface of the structure around the optical axis. Moreover, the optical system preferably has a deflecting means for further deflecting the laser beam deflected by the first wedge prism with respect to its optical path and scans, on a circumference of the first circle on the surface substantially perpendicular to the optical axis, an irradiation point of the laser beam so as to draw a trajectory of a second circle having a radius r2 around a moving point. It is preferable that a deflection angle of the deflecting means is smaller than a deflection angle of the first wedge prism.

It is preferable that the deflecting means is the second wedge prism, the first wedge prism rotates at a first rotation speed, and the second wedge prism rotates at a second rotation speed faster than the first rotation speed. Moreover, the attachment preferably has a mirror for reflecting the irradiated laser beam to a side surface of a protrusion formed on the surface of the structure.

Moreover, the laser irradiation apparatus preferably includes a distance sensor for measuring an inter-surface distance from a principal point of the optical system to the surface of the structure and a control unit for changing a focal distance of the laser beam by a variable focusing mechanism of the optical system so that the focal distance becomes equal to or longer than the inter-surface distance measured by the distance sensor. The attachment preferably has an expansion/contraction mechanism capable of changing the inter-surface distance from the principal point of the optical system to the surface of the structure. It is preferable that the laser head has a sensor for detecting that the attachment is in contact with or approaching to the surface, and a control unit for controlling irradiation of the laser beam is provided if contact or approach of the attachment to the surface is not detected by the sensor.

In the laser irradiation apparatus, the laser head may be configured to have a moving means for traveling inside a pipeline, and to cause the optical system to scan an irradiation point of the laser beam so as to draw a trajectory of a circle having a radius r corresponding to ½ of an inner diameter of the pipeline. The optical system may have a reflective mirror for reflecting the laser beam at a predetermined angle and a driving means for rotating the reflective mirror around an optical axis so that the irradiation point of the laser beam is scanned in the rear of a tip-end of the laser head. It is preferable that the optical system has a replaceable optical unit including an optical member for focusing or deflecting the laser beam and a body portion including a driving means for rotating the replaceable optical unit, and the replaceable optical unit is configured to be detachable to the body portion. The laser head preferably has at least two irradiation means for irradiating a red laser beam, each of the irradiation means is arranged so that the red laser beam is irradiated diagonally to the optical axis of the optical system and the red laser beams irradiated from the at least two irradiating means cross each other at a predetermined position.

In any one of the above-described laser irradiation apparatuses, the laser head preferably has a gas blowing means for blowing a gas supplied from a gas supply source in the vicinity of the irradiation point of the laser beam. The gas blowing means preferably fills the inside of a housing with a gas flow. The laser head preferably has an auxiliary irradiation means for applying energy to the vicinity of the irradiation point of the laser beam. Moreover, the laser head preferably has a cooling means for cooling at least a part of the optical system. In the optical system, a fiber connection portion connected to a tip-end of the fiber preferably has a lens for focusing the laser beam. It is preferable that energy density per unit time at a focal point of the laser beam is within a range of $1.25 \times 10^{-4}$ to $5 \times 10^{-4}$ J/μm$^2$, and a spot diameter of the irradiation point is within a diameter range of 20 to 200 μm. It is preferable that a control unit for stopping irradiation of the laser beam of the laser head is provided if it is determined by the sensor group provided on the laser head that the laser beam is deviated from the desired position. It is preferable that the laser head has a surface state detection sensor for detecting a state of the surface or a camera for observing a state of the surface, and a display apparatus for displaying information relating to the state of the surface obtained at least either one of the surface state detection sensor and the camera is provided. A control unit for setting a laser irradiation condition on the basis of the information relating to the state of the surface is preferably provided.

Moreover, the laser irradiation apparatus preferably includes a communication function connectable to a network and a control unit for transmitting the information to a server via the network using the communication function, obtaining the laser irradiation condition selected in the server, and setting the irradiation condition of the laser. The laser oscillator is preferably of a continuous oscillation type. The laser oscillator preferably generates a laser beam having an output within a range of 200 to 500 W and a wavelength within a range of 1060 to 1100 nm.

Any one of the above-described laser irradiation apparatuses is preferably mounted on a vehicle configured to be movable.

A laser irradiation system of the present invention includes: a laser irradiation apparatus including a laser head provided with a surface state detection sensor for detecting a state of a surface of a structure and a communication function connectable to a network; and a server connectable to the network, and is characterized in that the server acquires information relating to the state of the surface detected by the surface state detection sensor by the communication function via the network from the laser irradiation apparatus and selects a laser irradiation condition on the basis of the information relating to the state of the surface of the structure, and the laser irradiation apparatus acquires the selected laser irradiation condition and is capable of laser irradiation on the basis of the selected laser irradiation condition.

In the above-described laser irradiation system, the laser irradiation apparatus is preferably mounted on a vehicle configured to be movable. The laser irradiation apparatus preferably has a control unit limiting irradiation of a laser beam until an irradiation allowing signal is acquired from the server. If it is determined by the sensor group provided on the laser head that the laser beam is deviated from the desired position, the server preferably stops irradiation of the laser beam of the laser head. The server preferably acquires information relating to a state of the surface of the structure after laser irradiation detected by the surface state detection sensor by the communication function via the network from the laser irradiation apparatus and makes it into a database by associating it with the selected laser irradiation condition. Moreover, the server preferably acquires information relating to maintenance and management of the laser irradiation apparatus including a use state of the laser irradiation apparatus and maintains and manages the laser irradiation apparatus.

An aspect of the present invention includes a vehicle characterized by mounting any one of the above-described laser irradiation apparatuses.

A server of the present invention is characterized by selecting a laser irradiation condition on the basis of information relating to a state of a surface acquired by a surface state detection sensor via a network from a laser irradiation apparatus including a laser head provided with the surface state detection sensor for detecting the state of the surface of the structure and a communication function connectable to the network, and then transmitting the selected laser irradiation condition to the laser irradiation apparatus.

In the above-described server, it is preferable to transmit an irradiation allowing signal for allowing irradiation of the laser beam to the laser irradiation apparatus.

A coating removing method of the present invention is a method for removing a coating of a surface of a structure by laser irradiation and is characterized in that a laser irradiation apparatus including a laser oscillator, a fiber for transmitting a laser beam outputted from the laser oscillator, a suction source and a portable laser head for focusing the laser beam transmitted via the fiber and irradiating it to the surface of the structure is moved to an installation place of the structure, and the laser head irradiates the laser beam transmitted via the fiber on a surface substantially perpendicular to an optical axis of the laser beam so as to draw a trajectory of a first circle having a radius r1, while a removed matter generated from the irradiation point of the laser beam is suctioned.

A coating removing method of the present invention is a method for removing a coating of a surface of a structure by laser irradiation and is characterized in that a laser irradiation apparatus including a laser oscillator, a fiber for transmitting a laser beam outputted from the laser oscillator, a suction source and a portable laser head for focusing the laser beam transmitted via the fiber and irradiating it to the surface of the structure is moved to an installation place of the structure, and the laser head irradiates the laser beam transmitted via the fiber on the surface so that an inter-surface distance from a principal point of the optical system to the surface of the structure is equal or shorter than a focal distance of the laser beam, while a removed matter generated from the irradiation point of the laser beam is suctioned.

In the above-described coating removing method, the surface of the structure is preferably within a range of −5 to −25 mm closer to the laser head side than the focal point of the laser beam.

A method for removing an adhering matter of the present invention is a method for removing an adhering matter inside a pipeline by laser irradiation and is characterized in that a laser irradiation apparatus including a laser oscillator, a fiber for transmitting a laser beam outputted from the laser oscillator, a suction source and a laser head placed on a moving means capable of traveling inside the pipeline and irradiating the laser beam transmitted via the fiber is moved to an installation place of the pipeline, the laser head is made to travel inside the pipeline while an irradiation point of the laser beam is scanned so as to draw a trajectory of a circle having a radius r corresponding to ½ of an inner diameter of the pipeline, and a removed matter generated from the irradiation point of the laser beam is suctioned. In any one of the above-described methods, an irradiation condition of the laser beam may be changed in the laser head by removing a replaceable optical unit including an optical member for focusing or deflecting the laser beam from a body portion and by mounting another replaceable optical unit on the body portion.

Advantageous Effect of Invention

According to the present invention, by using a transportable and movable laser irradiation apparatus including a small-sized and light-weighted laser head, in a site of a structure that cannot be moved easily, a coating on the surface or the like can be removed and the removed matter can be suctioned and collected. Moreover, by a laser head provided with an optical system capable of circular scanning, the surface in a wide range can be efficiently treated, and a cost for removing a coating can be reduced. The other effects will be described in an embodiment of the invention.

EMBODIMENTS OF THE INVENTION

Figure 1:
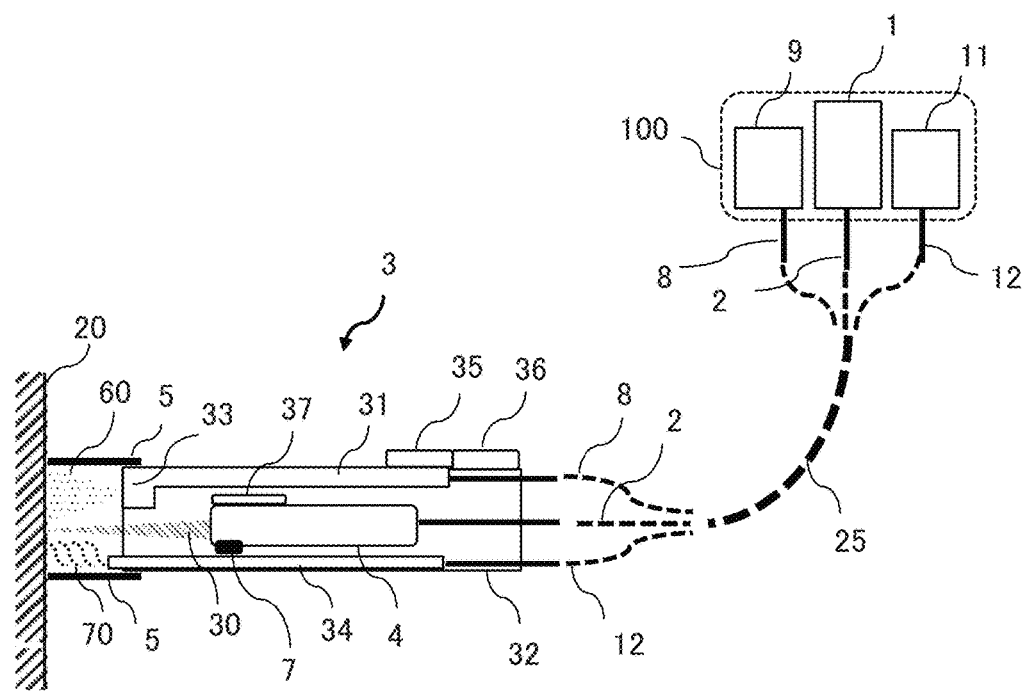
FIG. 1 is an outline configuration diagram of a laser irradiation apparatus of the first embodiment.

The present invention is a laser irradiation apparatus and a laser irradiation system including a small-sized and light-weighted laser head for efficiently removing a coating formed on a surface of a structure in a short time and configured transportable and movable to a work site. Moreover, a method for removing a coating using such a laser irradiation apparatus and laser irradiation system is included. Here, the structure includes those fixed to an installation place and cannot be easily moved such as a bridge, an expressway, an elevated track of a railway, a large-sized tank, a large-sized facility and the like and also includes those that can be moved to a service place such as an aircraft, a boat, a railway vehicle and the like. Furthermore, the structure includes a pipeline installed in various facilities.

The present invention is mainly intended to remove a coating on the surfaces of these structures but can be also applied to treatment on surface alteration such as undercoat treatment in overhaul inspections of a large-sized tank, pre-welding treatment of a large-sized mechanical facilities and the like and removal of stains or rusts of port and harbor facilities. Moreover, stains, graffiti and the like adhering to a concrete surface can be also removed. Furthermore, adhering matters, deposited matters, stains, rusts and the like adhering to the surface inside the pipeline (hereinafter collectively referred to as adhering matters) can be also removed. Particularly, it is preferably used for removal of radioactive-contaminated paint, adhering matters and the like.

The laser irradiation apparatus of the present invention includes at least a laser head, a laser oscillator, and a fiber for transmitting a laser beam outputted from the laser oscillator. The laser head is connected to the laser oscillator via the fiber and has an optical system for scanning an irradiation point of the laser beam. Note that, depending on the case, if a removed matter generated from the laser irradiation point is scattered and enters into the laser head and adheres to the optical system (lens), there is a concern that a temperature of the adhesion spot becomes high and the optical system is broken. Thus, a shielding member for protecting the optical system from the removed matter generated from the laser irradiation point is preferably provided in the laser head.

It is only necessary that the shielding member can prevent adhesion of the removed matter to the optical system inside the laser head, and its shape and arrangement can be set as appropriate in accordance with a mode of irradiation of the laser beam, a configuration of the laser head and the like. The shielding member is preferably arranged between an emitting end surface of the optical system and a surface to be treated. The shielding member may have a cylindrical shape covering an optical path of the laser beam (see FIG. 3) or may have a dome shape (see FIG. 16). Moreover, it may have a plate shape covering an emitting port of a housing 32 (see FIG. 10). If the optical system is configured to be rotatable around an optical axis as will be described later, the shielding member may be provided so as to rotate with the optical system or may be provided independently from rotation of the optical system. The laser irradiation apparatus of the present invention may use a laser beam having a conical shape flared to the end and in this case, the emitting port can be made wider so that a rotating laser beam can pass through or the shielding member may be rotated in accordance with a rotation speed of the laser beam (see FIG. 3). In a configuration in which one emitting port of the shielding member is provided on the optical axis and the flared conical laser beam is deflected toward the emitting port of the shielding member, the flared conical laser beam can be irradiated from a small emitting port without rotating the shielding member, which is particularly preferable (see FIG. 15). Note that the emitting port through which the laser beam is to be passed in the shielding member may be constituted as a physical opening or may be configured by a light-transmittable member which can transmit the laser beam instead of the physical opening. The entire shielding member may be constituted by a light-transmittable member, and in this case, the emitting port of the laser beam can be an appropriate position. Moreover, it is preferable that the shielding member is provided detachably so that it can be replaced when being stained.

If the removed matter generated from the laser irradiation point is not to be scattered to a periphery from the viewpoint of environmental preservation, the laser irradiation apparatus of the present invention may be provided with a suction source as necessary or may be provided with a suctioning means for suctioning the removed matter in the laser head. If the suctioning means is provided in the laser head, most of the removed matter generated at the laser irradiation point is collected by the suctioning means, but the removed matter might be drawn to an emitting end of the optical system, and there is concern that a part of the removed matter generated at the laser irradiation point adheres to the optical system. Thus, when the suctioning means is provided in the laser head, a shielding member for protecting the optical system from the removed matter generated at the laser irradiation point is preferably provided as necessary.

Moreover, the laser head may be attached with an attachment on a tip-end thereof and can move while being in contact with the surface of the structure. The attachment is preferably constituted detachably.

The laser head is preferably portable so that a worker can work on it manually. Alternatively, the laser head may be placed on a moving means (a conveying means). It is only necessary that the moving means is capable of relatively moving the laser head with respect to a surface to be treated and is not particularly limited. For example, it may be so configured that a manipulator is used as the moving means and the laser head is moved as appropriate along the surface of the structure. Moreover, a self-propelled or manually movable carriage and the like may be used as the moving means. In this case, the laser head can travel inside the pipeline, for example. In addition to the carriage on which the laser head is placed, the self-propelled moving means includes a driving means (a motor, an engine, an actuator and the like), a driving-force transmitting means for transmitting a driving force from the driving means to an internal wall of the pipeline and the like (a roller, a tire, a caterpillar and the like), a remote control means (including a wireless or wired communication unit, a control unit of the driving means and the like) and the like. When the manual moving means is to be constituted, it may be so configured that a wire or a rod or the like is connected to the carriage on which the laser head is placed so that the laser head is moved by operation of the worker. When the laser head is to be travelled by itself or manually inside the pipeline, the carriage on which the laser head is placed preferably has a cylindrical shape conforming to an inner diameter of the pipeline (see FIGS. 17 and 18).

In the method for removing a coating using this laser irradiation apparatus, the surface to be treated is preferably arranged at the focal distance of the laser beam or in front of the focal distance and is particularly arranged so that, assuming the focal point is a reference (0), the laser head side (near distance) is negative, and the depth side (far distance) is positive, the surface to be treated is located within a range of preferably 0 to −30 mm or more preferably of −5 to −25 mm.

Energy is concentrated the most at the focal point of the laser beam, but a treatment region (spot diameter) becomes narrow to the contrary and thus, treatment capability of coating removal deteriorates. Since energy is too strong depending on the case, an undercoat might be damaged or ignited. Thus, the treatment region (spot diameter) can be made wider so that treatment can be performed at appropriate energy density by shifting the focal point of the laser beam in an optical axis direction from the surface of the structure (defocusing).

Moreover, when the laser beam is to be actually defocused, it was confirmed that defocusing to the negative side obviously improved coating removing performance than defocusing to the positive side. For example, if the surface to be treated was arranged on the positive side by 20 mm (far distance), smoke was generated from the coating surface, and coating removal became uneven or insufficient but if the surface to be treated on the negative side was arranged similarly by 20 mm (near distance), laser abrasion strongly occurred on the coating surface, and efficient coating removal could be realized. The reason is considered to be that, when the laser beam is irradiated to the removed matter peeled off the coating surface and flying, the size of the laser beam becomes close to the size of the removed matter in the vicinity of the focal point position, and thus, a moment when much of laser power is shielded occurs. The arrangement of the irradiation surface in front of the focal point will be referred to as "negative focus" below.

When the laser head is to be moved manually, it is difficult to keep a distance to the surface to be treated constant. Thus, this laser irradiation apparatus is preferably configured such that the distance to the surface to be treated is made constant (preferably negative focusing) by the length of the attachment of the laser head. Moreover, the length of the attachment may be made adjustable so as to adjust the negative focus amount. Furthermore, by making the focal distance of the laser beam settable as appropriate in addition to the attachment or without the attachment so that the negative focusing amount can be adjusted in accordance with the state of a coated matter (coating) for the focal distance of the laser beam. Furthermore, a surface distance measuring means may be provided in order to keep the distance to the surface to be treated within a predetermined range instead of the attachment or in addition to the attachment.

In the optical system of this laser head, a wedge prism rotatable around the optical axis and a rotation driving means for rotating it are preferably employed, whereby the laser beam can be irradiated so as to have a conical shape flared toward the end. If the surface region as a target is substantially flat and the optical axis becomes substantially perpendicular to this surface, a continuous trajectory of an irradiation point of the laser beam on the surface becomes a circular shape around an intersection between the optical axis and the surface and having a deflection amount of the wedge prism as a radius. Here, circular scanning of the irradiation point of the laser beam is referred to as "circular scanning" with respect to conventional linear scanning. When the worker holds this laser head for a certain period of time or reciprocally moves it vertically or horizontally as necessary, a coating in a specific range or a wide range can be efficiently removed in a short time by laser abrasion.

Moreover, in the optical system of this laser head, the wedge prism rotatable around the optical axis and the deflecting means can be employed, and the laser beam can be irradiated so as to have a conical shape flared toward the end (may be partially hollow). For the deflecting means, a wedge prism is preferably used, whereby the continuous trajectory of an irradiation point of the laser beam on the surface has a shape in which a second circle having a deflection amount of a second wedge prism (second wedge prism) as a radius continuously rotates around a moving point on a circumference of a first circle having a deflection amount of a first wedge prism (first wedge prism) as a radius. If the irradiation point of the laser beam is continuously scanned for a certain period of time while the optical axis is fixed with respect to the surface, the continuous trajectory can be considered a substantial annular or circular plane, and substantially uniform laser irradiation can be realized.

If the radius of a circle when the laser beam is used for circular scanning or the scanning method of the laser beam is changed, it is necessary to change arrangement of the scanning optical system or to change the configuration, but in the present invention, in the scanning optical system of the laser head, since the replaceable optical unit including various optical members and the body portion including at least the driving means is configured to be detachable by simple operation from the body portion of the laser head, the irradiation condition of the laser beam can be also easily changed.

In the present invention, if the attachment is to be added to the laser head, a closed space can be formed between the housing of the laser head and the surface so as to prevent scattering of the removed matter of a coating containing harmful substances to the environment and human bodies. By providing the suctioning means in addition to the attachment, the removed matter can be suctioned in the closed space. This attachment is preferably provided with an expansion/contraction mechanism so as to be capable of expansion/contraction in accordance with setting. As a result, a distance from the housing to the surface during a work can be kept constant. Moreover, at least a part of the attachment is constituted by a deformable joint so that coating removal can be performed even in a complicated structure, and an appropriate reflecting means is provided. As a result, the housing of the laser head can be brought into contact with the surface by an arbitrary angle with respect to a normal line of the surface. Moreover, the attachment may be configured to have a mirror for irradiating the laser beam to a side surface of a protrusion so that a coating can be removed not only from the flat surface but also from the protrusion on the surface.

Moreover, the laser irradiation apparatus may be configured to be connectable to a server via a network. In such a system, the server acquires information relating to the state of the surface detected by a sensor mounted on the laser head, and a laser irradiation condition suitable for the coating removal can be selected in accordance with the state of the surface and can be transmitted to the laser irradiation apparatus.

Each of embodiments of the present invention will be explained below by referring to the attached drawings. However, the present invention is not limited to the following examples.

First Embodiment

A laser irradiation apparatus of a first embodiment is a laser irradiation apparatus including a small-sized and light-weighted portable laser head for removing a coating on a surface 20 of a structure and collecting the removed matter without scattering.

FIG. 1 is an outline configuration diagram of the laser irradiation apparatus of the first embodiment. This laser irradiation apparatus includes a laser oscillator 1, a fiber 2, a laser head 3, a suction hose 8, and a suction source 9 and may also include a gas supply source 11 and a gas hose 12. The laser head 3 is a small-sized and light-weighted portable one, connected to the laser oscillator 1 via the fiber 2, and can be handled at a work site.

Moreover, the laser oscillator 1, the suction source 9, and the gas supply source 11 are also apparatuses configured to be transportable and movable and may be mounted on various types of vehicles 100 (a carriage, a vehicle, a barge, a mono-rack (including a monorail and a conveyer) and the like). In this laser irradiation apparatus, irradiation conditions such as an output of laser, a focal position, a beam width, a scanning speed and the like can be set as appropriate in accordance with a type, a nature and the like of the surface.

The laser oscillator 1 is constituted by an excitation source, a laser medium, an optical resonator (mirror) and the like. The excitation source may be either of a continuous wave oscillation (CW) type or a pulse oscillation type, and an ark lamp, a flash lamp and the like can be used. Moreover, a driving means for driving by application of an excitation current and the like in accordance with a light source to be used may be provided. For the laser medium, a solid laser (ruby laser, YAG laser and the like) or semiconductor laser (laser diode) is preferably employed. Particularly, fiber laser is preferably used as the solid laser. The laser medium is not particularly limited and gas laser ($CO_2$, excimer laser and the like), liquid laser (dye laser) and the like may be used other than them. Note that the laser outputted from the laser oscillator 1 is transmitted to the laser head 3 via the fiber 2 for transmission.

By constituting the laser oscillator 1 by the fiber laser, various advantages can be obtained. In the fiber laser, a fiber added mainly with rare earth ions is used as a laser medium, and wide-band optical amplification is possible as compared with solid laser using YAG crystals and the like. Since the fiber laser can be provided by winding a fiber in the oscillator, the laser oscillator can be constituted to be small-sized and light-weighted and to be easy to be moved and transported, and sufficient amplification can be obtained even if a gain per unit length is small.

Moreover, since the fiber laser has a surface area/volume ratio of the fiber larger than that of a bulk-type solid laser and has an excellent heat radiation property, air cooling can be employed as a cooling method to make it a simple configuration can be employed. Since a numerical aperture NA is small, a condensing diameter can be easily made smaller. Moreover, since the fiber laser has a shorter oscillation wavelength and an excellent beam quality as compared with $CO_2$ laser, a focal depth can be set larger. Furthermore, since the laser emitted from the fiber laser has a high binding rate with a transmission fiber, even if a distance from the laser oscillator main body to the surface is far, the laser can be transmitted with a smaller loss.

As described above, according to the fiber laser, the coating removing work can be performed by transporting and appropriately moving the laser oscillator 1 itself to the vicinity of the surface of the structure (work site). However, the laser is irradiated to the surface by the laser head 3 which can be handled, and it is only necessary that the laser oscillator 1 itself is arranged in a range reachable from the fiber 2.

Since the present invention has an object of removal of a coating on the surface, not drilling or cutting treatment of a workpiece, it is not necessary to obtain a large energy density in one session of laser irradiation, and it is only necessary that the energy density enough to remove the coating in plural sessions of the laser irradiation can be obtained. Thus, in this embodiment, a high-output laser oscillator does not have to be used.

Moreover, in accordance with a type of the structure or the coating to be a target and an entire configuration of the apparatus, either one of the CW-type laser and the pulse-type laser may be selected. Particularly, the CW-type laser requires large electric power to acquire desired irradiation energy as compared with the pulse-type laser, but its cost is low, which is preferable. According to the inventors, it was confirmed that in laser irradiation per unit time and unit area, the CW-type laser has less thermal damage applied on an undercoat or a base material than the pulse-type laser, and the surface after the coating removal is smoother.

As described above, by employing the CW-type laser, it is likely that painting processing after the coating removal is facilitated, which is preferable. However, this embodiment is not limited to the CW-type laser but either one of the CW-type laser and the pulse-type laser may be selected in accordance with the type of the structure or the coating as a target and the entire configuration of the apparatus and the like.

The laser head 3 is an apparatus for irradiating the laser outputted by the laser oscillator 1 and transmitted via the fiber 2 toward the surface 20 of the structure, for removing the coating on the surface 20, and for suctioning the removed matter and is configured to be capable of being handled at a work site. The laser head 3 has an optical system 4, a suctioning means 31 for suctioning a removed matter 60, a housing 32 accommodating them, and an attachment 5 mounted on a tip-end of the housing 32. Moreover, the laser head 3 may have a shielding member (not shown) for protecting the optical system 4 from the removed matter generated from a laser irradiation point.

Moreover, other than the above, a gas blowing means 34 for blowing a gas 70 to the vicinity of the irradiation point of the surface 20, a control unit 35 for controlling the optical system and the like, an operating unit 36 into which operation from the worker is inputted, an auxiliary irradiation means 37 for promoting ablation by irradiation of the laser beam, a sensor group 7 including a contact proximity sensor, a coating visualizing sensor, a vibration detection sensor and the like, and a power supply unit (not sown) may be included. A specific configuration of the sensor group 7 will be described later by using FIG. 11.

The laser head 3 can appropriately set strength of the laser irradiation and the like by changing the output of the laser oscillator 1. Moreover, the laser head 3 is configured to be capable of appropriately setting the irradiation condition such as a focal position, a beam width, a scanning shape and the like by the optical system 4 in accordance with the state and the nature of the structure or the surface.

A laser beam 30 irradiated from the laser head 3 preferably has an output of 100 to 2000 W and a wavelength of 500 nm or more or particularly preferably has an output within a range of 200 to 500 W and a wavelength within a range from 1060 to 1100 nm. Moreover, energy density per unit time at a focal point can be designed as appropriate in accordance with a material and a state of the surface and irradiation time but it is preferably within a range of $1.25 \times 10^{-4}$ to $5 \times 10^{-4}$ J/$\mu$m$^2$. Note that a spot diameter of the laser beam may be set as appropriate in terms of a relationship with energy density and a dimension of a workpiece but it preferably has a diameter within a range of 20 to 200 $\mu$m.

The optical system 4 is constituted by a combination of a light collecting element, a reflecting element, a refracting element, a driving means and the like, for example, and focuses the laser beam emitted from an emitting end of the fiber 2 and irradiates the laser beam 30 to the surface 20 and is also capable of scanning the irradiation point of the laser beam 30 on the surface 20 linearly or in a curved manner. An appropriate configuration can be employed for the optical system 4, but in order to make the laser head small and simple, it preferably has a configuration of deflecting the laser beam using a permeable refracting element. A specific configuration of the optical system 4 will be described later by using FIGS. 3 and 5.

The housing 32 is preferably configured to have a small size and a shape with excellent gripping performance so that the worker can grip it easily.

When the laser beam 30 is irradiated to the surface 20, the irradiation point enters a high-temperature and high-pressure state in which ablation (melting/transpiration) occurs, and a coating is removed by an action of this ablation. When the laser beam is irradiated, a removed matter is generated from the vicinity of the irradiation point. In this embodiment, since the suctioning means 31 is provided on the laser head 3, the removed matter 60 is basically collected via a suction port 33 of the suctioning means 31, but a part of the removed matter 60 is drawn to a direction of the optical system 4 and might adhere to the lens of the optical system 4. Thus, on the laser head 3, a shielding member (not shown) for protecting the optical system 4 from the removed matter generated from the laser irradiation point is preferably provided. Regarding the shielding member, a shielding member arranged between the emitting end face of the optical system 4 and the surface to be treated is preferably provided. The shielding member may be a plate-shaped member in which an opening is provided only at an optical axis portion or may be a plate-shaped member without an opening having light permeability to the laser beam (protective glass and the like).

The attachment 5 is preferably attached detachably to a tip-end of the housing 32 of the laser head and is brought into close contact with the surface 20 so as to form a closed space. Here, the closed space is preferably a fully closed and sealed space but may have a slight gap. It is only necessary that the attachment 5 is configured to be able to move the laser head 3 in contact with the surface 20 but it is preferably configured to be capable of being brought into contact with a curved surface. For example, the attachment 5 may be formed of a soft and deformable resin, or a sliding assisting means may be provided on a side in contact with the surface of a tip-end of the attachment. The sliding assisting means may be a tire or a roller, or a brush-like or a curtain-like member formed of a flexible member may be provided.

Moreover, it is preferable that the attachment 5 has an expansion/contraction mechanism, and a distance d (see FIG. 2A) from the principal point of the scanning optical system 4 to the surface 20 can be set appropriately. For the expansion/contraction mechanism of the attachment 5, a zoom mechanism, an autofocus mechanism and the like of a general camera may be used, for example. In the attachment 5, a deformable joint portion (flexible tube) may be formed at least at a part thereof so that an orientation of an optical axis L of the laser head 3 can be changed with respect to the normal line of the surface 20.

In this laser head 3, an interval between the laser head 3 and the surface 20 can be set as appropriate by the expansion/contraction mechanism of the attachment 5 mounted on the laser head tip-end. Moreover, the focal distance of the laser beam 30 can be set as appropriate by the optical system 4.

Figure 2A:
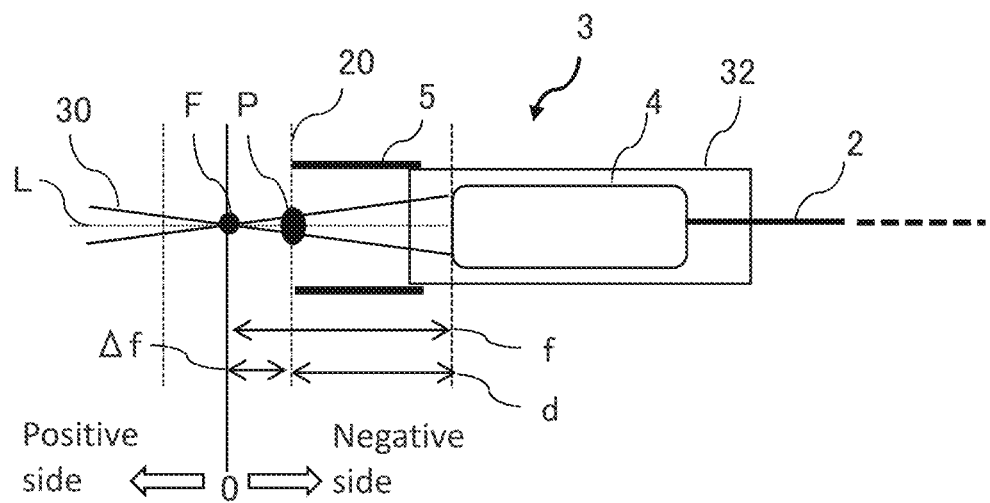
FIG. 2A is an explanatory view illustrating a positional relationship between a focal point and an irradiation point.

FIG. 2A is an explanatory view illustrating a positional relationship between a focal point F and the irradiation point. The inventor found as the result of keen studies that a coating can be removed more efficiently by moving the position of the surface 20 to the negative side in the direction of the optical axis L from the focal point F (negative focusing) and by arranging the surface 20 to be treated in front of the focal point rather than arranging the surface 20 at the focal point F of the laser beam 30.

Assuming that, with the focal point F as a reference, a distance to the irradiation point (irradiation spot) P of the laser beam 30 on the surface 20 is $\Delta f$ (defocusing amount), the defocusing amount (in the case of negative) is specified by a relationship of the focal distance f from the principal point of the optical system 4 to the focal point F and the distance d from such principal point to the surface 20 (hereinafter referred to as an "inter-surface distance"). Note that, in this figure, the inter-surface distance d and the focal distance f starts from the emitting-side end of the optical system 4 in the housing 32 for the convenience of explanation, but actually the principal point of the optical system shall be the start point. The defocusing amount $\Delta f$ is acquired by the distance d—the focal distance f, and it is preferably set in a range of 0 to −30 mm, or more preferably set within a range of −5 to −25 mm. Note that if the laser beam is deflected, the surface to be treated is preferably arranged within a range of 0 to −30 mm with respect to the focal point along the optical path of the deflected laser beam, and more preferably set within a range of −5 to −25 mm.

In this embodiment, the defocusing amount $\Delta f$ (in other words, a position of the focal point to the surface to be treated) can be set as appropriate by changing the inter-surface distance d, and the inter-surface distance d when the laser head is in contact can be changed as appropriate by the attachment 5 provided with the expansion/contraction mechanism, for example. With a configuration in which the focal distance f can be changed as appropriate by the optical system 4 (variable focusing mechanism), the position of the focal point can be changed without using the expansion/contraction function with the attachment in contact. Moreover, the defocusing amount may be changed as appropriate by using both the expansion/contraction function of the attachment and the variable focusing mechanism of the optical system.

By referring to FIG. 1 again, the suctioning means 31 suctions the removed matter 60 (powder dusts of the coating, micro fractions) generated from the irradiation point of the laser beam 30 via the suction port 33 by a negative pressure applied by the suction source 9. The suction source 9 is a pump for applying a suction force, for example, and a treatment chamber for treating the suctioned removed matter 60, an air-exhaust filter and the like may be also provided. The removed matter 60 suctioned from the suctioning means 31 may be collected by the suction source 9 via the suction hose 8, while the remaining harmless air and the like may be exhausted via the air-exhaust filter. The suctioning means 13 suctions the removed matter 60 generated from the irradiation point of the laser beam via the suction port 33 in the closed space formed by the attachment 5.

The gas blowing means 34 is to blow the gas supplied from the gas supply source 11 via the gas hose 12 to the vicinity of the irradiation point of the laser beam 30 and has an action of guiding the removed matter 60 toward the suction port 33 of the suctioning means 31 so that the removed matter 60 (also including powder dusts of the coating, micro fractions, smoke and the like) generated from the vicinity of the irradiation point by ablation does not interfere with the laser irradiation in order to irradiate the laser beam 30 to the surface more reliably. Moreover, it may also be used for preventing or reducing contamination or the like of the emitting end surface of the optical system 4 (lens) inside the housing 32 by the removed matter as necessary.

The gas supply source 11 is constituted by a tank, a bomb, a compressor and the like, for example. The gas can be selected as appropriate in accordance with the state, the material, the nature and the like of the work environment or the surface. For example, dry air, nitrogen, carbon dioxide, inactive gas (helium, neon, argon and the like, for example) or a charged gas as a measure against static electricity may be used. When a toxic reaction gas might be generated from the surface, nitrogen or an inactive gas is preferably supplied or an active gas for neutralizing the reaction gas is preferably supplied in order to reduce generation thereof. Moreover, not limited to the gas, but a liquid (including mist (steam)) may be blown. The liquid includes water for heating the surface, a treatment agent for promoting ablation, chemicals such as an undercoat protecting agent after the coating removal and the like.

Note that the fiber 2, the suction hose 8, the gas hose 12, and a power cable (not shown) connecting the laser oscillator 1, the suction source 9, and the gas supply source 11 to the laser head 3 may be bundled into one integral cable 25 so that the worker can handle the laser head 3 easily at the work site.

Moreover, when the laser beam is irradiated, the removed matter generated from the vicinity of the irradiation point may be charged with static electricity. Since such removed matters can easily adhere to the lens of the optical system, they might reduce the life of the lens. Thus, an antistatic means is preferably provided in the laser head. As the antistatic means, for example, a gas blowing means can be used to supply gas containing ions in accordance with a charged amount of the removed matter so as to remove static electricity. Alternatively, as described above, the shielding member for shielding adhesion of the removed matter to the optical system can be used, and a conductive member may be provided at least at a part of the shielding member so as to remove the removed matter charged with static electricity. Moreover, a member for removing static electricity may be provided at an appropriate position in the laser head separately from the shielding member. Moreover, the antistatic means may remove static electricity from the removed matter flying to the periphery of the optical system by supplying magnetism.

The auxiliary irradiation means 37 applies various types of energy to the vicinity of the irradiation point in order to assist ablation as necessary (for example, when the coating on the surface 20 is thick and requires laser irradiation for removal for a long time). The auxiliary irradiation means 37 may be constituted capable of irradiating light, heat, ultrasonic waves, microwaves or laser, for example. Specifically, a halogen lamp or a metal halide lamp capable of heating by light irradiation, an ultrasonic heater, a magnetron type microwave oscillator, carbon-dioxide gas laser for surface heating and the like can be employed. Moreover, the auxiliary irradiation means 37 can be illumination for photographing a state of the surface by a CCD camera (reference numeral 73 in FIG. 11).

The control unit 35 has a function for controlling the scanning mechanism and the variable focusing mechanism of the optical system 4, the expansion/contraction mechanism of the attachment 5, the suctioning means 31, the gas blowing means 34, the operating unit 36, the auxiliary irradiation means 37 and the like. The control unit 35 may be configured to realize various types of processing by allowing hardware and a program to collaborate with each other or may be constituted by an exclusive processing circuit. In the same figure, the control unit 35 is provided in the laser head body but may be provided separately from the laser head body, and a terminal connected wirelessly or by wire (see reference numeral 82 in FIG. 14) may be configured as a control unit for controlling the laser head 3, for example.

The operating unit 36 has a function for receiving operation of the worker and outputting it to the control unit 35. Moreover, it may have a function for displaying the result of the operation, a state of coating removal, parameters of the laser and the like. The operating unit 36 is constituted by various switches, knobs, a software keyboard, a display apparatus and the like.

As described above, according to the laser irradiation apparatus of the first embodiment, a coating on the surface can be removed at the work site by using the transportable and movable laser irradiation apparatus, and the removed matter can be collected. Since the portable laser head capable of being handled and connected to the laser oscillator via the fiber is used, the coating removing work becomes easy for the worker. Moreover, the laser output and wavelength can be set as appropriate in accordance with the state of the surface, and laser irradiation suitable for the coating removal can be performed.

Moreover, according to the optical system of this laser head, the irradiation conditions such as the position of the focal point, the beam width, the scanning speed and the like can be set as appropriate, and laser irradiation suitable for the coating removal can be performed. Moreover, by using the suctioning means and the attachment provided on such laser head, the coating can be removed and the removed matter can be efficiently suctioned without scattering. By setting the inter-surface distance by the expansion/contraction mechanism of the attachment as appropriate, the defocusing amount can be adjusted in accordance with the state of the surface, and ablation suitable for the coating removal can be realized.

Moreover, according to the attachment of this laser head, an appropriate space for suctioning of the removed matter can be ensured, and there is little concern that the suction port is clogged by concentrated removed matters. Moreover, leakage and scattering of the laser beam can be prevented, and safety for the worker can be ensured. Since the worker moves the laser head while bringing this attachment into contact with the surface, the inter-surface distance d can be kept constant, and the removing work can be proceeded with efficiently.

Figure 5:
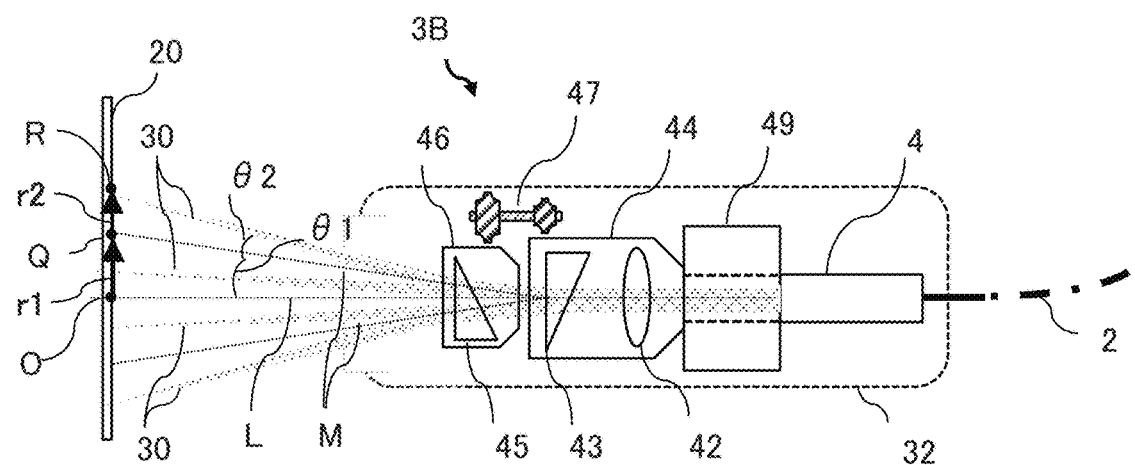
FIG. 5 is an outline configuration diagram of a laser head of the third embodiment.
Figure 6:
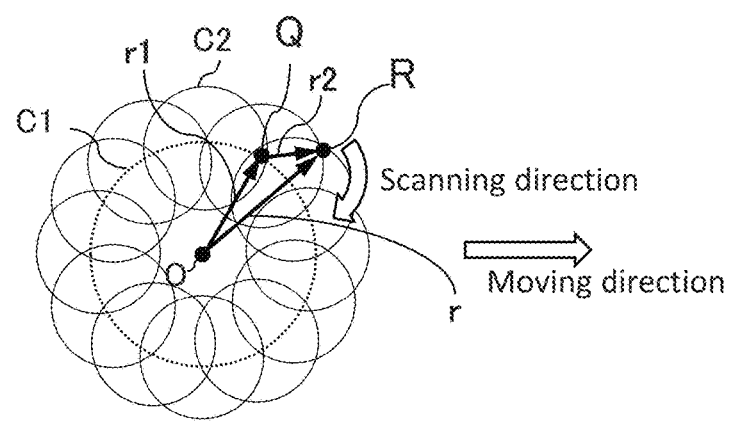
FIG. 6 is an explanatory diagram illustrating an example of a trajectory of a laser irradiation point according to the third embodiment.
Figure 7:
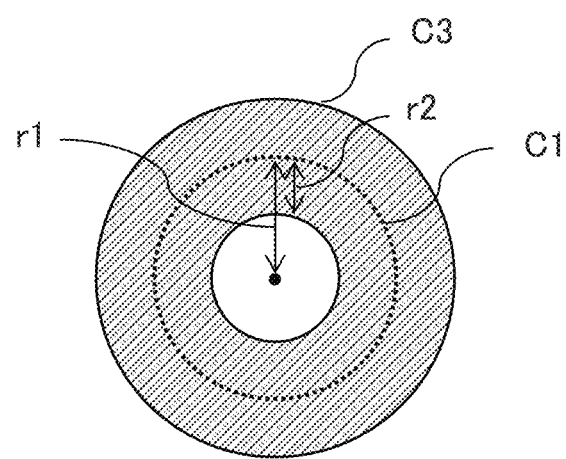
FIG. 7 is an explanatory diagram illustrating another example of the trajectory of the laser irradiation point of the third embodiment.

Another embodiment of the optical system inside of this laser head will be explained below. First, as a second embodiment, a configuration of a laser head using one wedge prism for a scanning mechanism will be explained (FIGS. 3 and 4), and then, as a third embodiment, a configuration of a laser head using a wedge prism and a deflecting means for the scanning mechanism will be explained (FIGS. 5 to 7). However, the present invention is not limited to the following examples.

Second Embodiment

In the second embodiment, a wedge prism rotatable around an optical axis and a driving means for rotating it are used in the optical system, and the laser beam is irradiated having a conical shape (side surface) flared to the end. A continuous trajectory of the irradiation point of the laser beam on the surface becomes a circle C1 around an intersection between the optical axis and the surface and having a deflection amount of the wedge prism as a radius r1. Hereinafter, the optical system that can scan the irradiation point by a driving mechanism or the like will be also referred to as a scanning optical system.

Moreover, when the worker holds this laser head for a certain period of time or reciprocally moves it vertically or horizontally as necessary, a coating in a specific range or a wide range can be efficiently removed by laser ablation in a short time.

Figure 3:
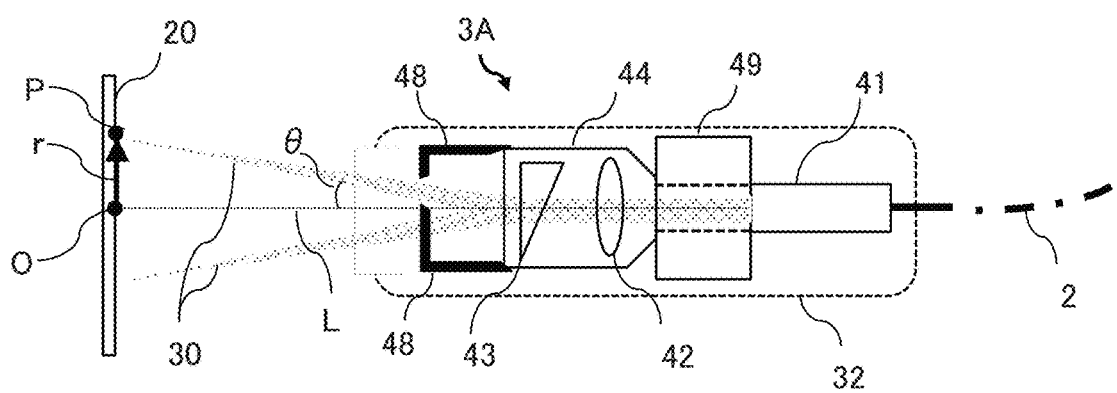
FIG. 3 is an outline configuration diagram of a laser head of the second embodiment.

FIG. 3 is an outline configuration diagram of the scanning optical system of the laser head of the second embodiment. This laser head 3A is connected to the laser oscillator 1 via the fiber 2 and can be handled at the work site. In this embodiment, the scanning optical system 4 includes a fiber connection portion 41, a light collecting means 42, a first wedge prism 43, a support member 44, and a driving means 49.

The fiber connection portion 41 is an optical element (laser emitting collimator (quartz lens, for example) mounted at an emitting end of the fiber 2 and emits the laser beam transmitted via the fiber 2 toward the light collecting means 42 as parallel light.

The light collecting means 42 is a light-collecting optical system constituted by one or more lenses and collects the laser beam outputted from the fiber connection portion 41 at high energy density and irradiates it as the laser beam 30 to the surface 20. Regarding the light collecting means 42, a focal distance, a focal depth, and a beam spot diameter of the laser beam 30 can be set as appropriate.

The first wedge prism 43 is an optical element for deflecting the incident laser beam at a deflection angle $\theta$ with respect to the optical axis L. The first wedge prism 43 (and the light collecting means 42) is supported by the support member 44. In this embodiment, the wedge prism is employed as an optical member for deflecting an optical path of the laser beam. As a result, the optical path of the laser beam becomes simple without repeating reflection as compared with use of the optical member such as a galvanomirror and thus, the configuration of the laser head can be made small and simple.

The driving means 49 rotates the first wedge prism 43 by rotating the support member 44 at a predetermined rotation speed ω around the optical axis L. For the driving means 49, an appropriate configuration such as a motor, a rotary actuator and the like can be employed, but in order to make the configuration of the laser head small and simple, a hollow motor that can be arranged around the optical axis is preferably employed.

According to such scanning optical system 4, the irradiation point P of the laser beam 30 (including the irradiation spot) appears at a position of a distance r from an optical axis intersection O on the surface 20. The distance r is a deflection amount on the basis of the deflection angle θ of the first wedge prism 43, the distance from the first wedge prism 43 to the surface 20 and the like.

Moreover, a shielding member 48 for protecting the first wedge prism 43 can be employed for shielding the removed matter generated from the vicinity of the irradiation point of the laser beam. The shielding member 48 is configured to be fixed to the first wedge prism 43 or the support member 44 and rotatable with them and has an opening through which the laser beam 30 deflected in accordance with the deflection angle of the wedge prism is passed at an appropriate position. In this embodiment, the suctioning means (reference numeral 31 in FIG. 1, for example) and the attachment (reference numeral 5 in FIG. 1, for example) are not provided, and the removed matter generated from the laser irradiation point P is scattered to the periphery, but since the shielding member 48 is provided, the wedge prism can be protected from the removed matter peeled off and scattered from the surface 20. Moreover, it may be so configured that a conductive member is provided at least at a part of the shielding member 48 so as to actively remove the removed matter charged with static electricity. Moreover, it may be so configured that, by using the gas blowing means (see reference numeral 34 in FIG. 1 or FIG. 11) as an antistatic means, static electricity can be removed by supplying a gas containing ions from such a gas blowing means in accordance with the charged amount of the removed matter.

In this embodiment, it is only necessary that energy density enough to remove the coating in several sessions of circular scanning can be applied in removing the coating and thus, the focal point does not have to be matched with the actual irradiation point of the laser beam, unlike the conventional laser working apparatus intended for drilling, cutting, spot welding of the metal and the like. In the circular scanning, since an optical path length of the laser beam 30 becomes substantially equal at each point on the substantially circular trajectory, the distance between the focal point and the actual irradiation point does not change in the rotary scanning, unlike the linear scanning, and constant irradiation energy can be irradiated. Moreover, in order to effectively use the energy of the laser, the position of the focal point is preferably set close to the depth from the surface (defocusing to the negative side). Furthermore, the focal depth may be set deeper to some degree. As a result, coating removal treatment can be performed also for the surface of a structure with a protrusion, a step or a depth.

Figure 2B:
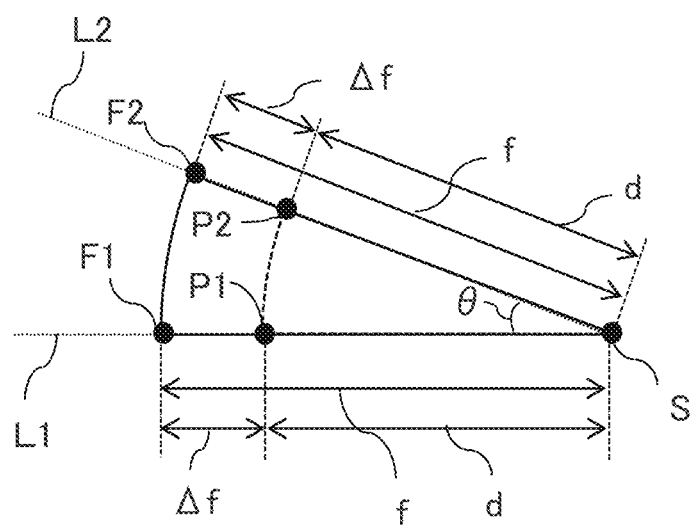
FIG. 2B is a diagram for roughly explaining a positional relationship between a focal point and an irradiation point when a laser beam is deflected.

FIG. 2B is a diagram for roughly explaining a positional relationship between the focal point and the irradiation point when the laser beam is deflected. When the laser beam is deflected by the deflection angle θ with respect to the optical axis L1 by the optical system 4 having the wedge prism, a focal point F1 and an irradiation point P1 on the optical path L1 without deflection are moved to positions corresponding to F2 and P2 on a new optical path L2 having the deflection angle θ. Thus, when the defocusing amount Δf is set on the basis of F2, the surface to be treated is preferably arranged at a position of P2 within a range of 0 to −30 mm with respect to the focal point F2, or more preferably arranged within a range of −5 to −25 mm. Note that FIG. 2B uses a principal point S as a reference for deflection for convenience of explanation that the focal distance f when the laser beam is deflected goes along the optical path of the deflected laser beam, but it might be different from the principal point in an actual optical system.

Moreover, the laser head is brought into contact with the surface by the attachment 5, and the distance from the scanning optical system to the surface is constant all the time. From this point of view, too, employment of the circular scanning with the unchangeable optical path length is preferable. Furthermore, in this embodiment, since the irradiation point of the laser beam is subjected to rotary scanning in a circular state around the optical axis intersection, even if the laser beam is reflected from the surface, there is no concern that return light enters the laser head and damages the fiber 2. In addition, in this embodiment, since the antistatic means is provided in the laser head, the removed matter charged with the static electricity is prevented from adhering to the optical system, or static electricity can be removed from the removed matter.

Figure 4:
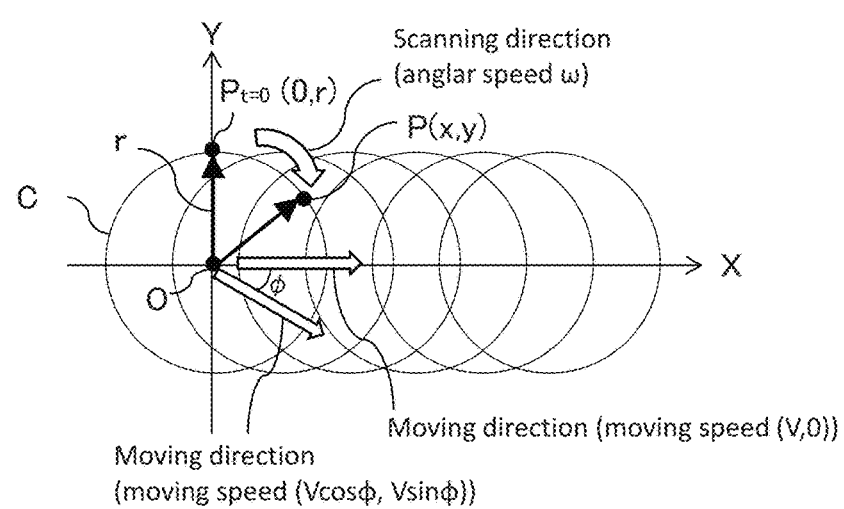
FIG. 4 is an explanatory diagram illustrating a trajectory of a laser irradiation point of the second embodiment.

FIG. 4 is an explanatory diagram illustrating a trajectory of the laser irradiation point by the laser head of the second embodiment. When the optical axis L and the surface 20 are substantially perpendicular and the surface 20 is a substantially flat plane without curve or irregularity, since the first wedge prism 43 rotates around the optical axis L at the rotation speed ω, the irradiation point P of the laser beam becomes a moving point moving at the rotation speed ω on the circumference of the circle having the radius r around the optical axis intersection O on the surface 20.

In other words, the irradiation point P draws a trajectory of the circle C (including a substantially circular shape) around the optical axis intersection O. Therefore, if the laser beam 30 is irradiated to the surface 20 of the structure by using the laser head 3A of the second embodiment, the coating is removed by laser ablation along the circumference of the circle C on the surface 20. Note that, for facilitation of explanation, the circumference of the circle C is expressed as a line without width in the figure, but actually, the laser beam 30 has a width of the spot diameter. Moreover, the radius r is preferably set so as to be 5 to 200 mm.

By moving the laser head 3 automatically or by operation of the worker at a certain speed in a vertical direction or in a horizontal direction in parallel with the surface 20 while the circular scanning as the shape of the circle C is performed, the trajectory of the irradiation point P substantially becomes a band shape. As describe above, since the irradiation point P can be scanned substantially uniformly with respect to the surface 20, the coating in a wide range on the surface 20 can be efficiently removed in a short time. In the figure, the laser head 3A is moved linearly in a specific direction but it may be moved in a Z-shaped state, a zigzag state, an arc state or a spiral state, for example, in accordance with a type of the structure, a state of the surface and the like.

Note that, in this figure, for facilitation of explanation, a shape in which the circle C continues in a moving direction of the laser head is schematically illustrated. However, actually, the irradiation point is scanned circularly while the laser head (that is, the optical axis intersection) is moved, the trajectory of the irradiation point P becomes a shape of a coil which is an open curve not that the circle C which is a closed curve continues. More strictly, the trajectory of the irradiation point P becomes a trajectory of an end point of a radius vector r rotating at the rotation speed ω.

Specifically, if, at time t=0, for example, the irradiation point P is on the Y-axis and starts rotation at an angular speed ω (only circular scanning), a trajectory (Px, Py) of the irradiation point at the time t is expressed by the following formula:

$$Px = r \sin \omega t$$

$$Py = r \cos \omega t \qquad \text{Formula 1}$$

Furthermore, if the worker moves the laser head at a certain speed V in a direction of a vector having an angle (to the X-axis, for example, the trajectory (Px, Py) of the irradiation point at the time t is expressed by the following formula:

$$Px = r \sin \omega t + Vt \cos \Phi$$

$$Py = r \cos \omega t + Vt \sin \Phi \qquad \text{Formula 2}$$

Particularly when the laser head is moved in the horizontal direction (X-axis direction), it can be expressed as follows:

$$Px = r \sin \omega t + Vt$$

$$Py = r \cos \omega t \qquad \text{Formula 3}$$

Moreover, this figure illustrates an instance in which the optical axis L and the surface 20 are substantially perpendicular, the surface 20 is flat, and the trajectory of the irradiation point P is substantially circular. If the laser head is held with inclination to the normal line of the surface (that is, the optical axis L and the surface 20 are not substantially perpendicular), the trajectory of the irradiation point P becomes oval (including a shape of substantially oval).

Moreover, if the surface 20 has irregularity formed or has a curve, the trajectory of the irradiation point P becomes a distorted circle or an oval. In these cases, strictly speaking, the optical path length of the laser beam at each of the irradiation points on the trajectory becomes different from each other and thus, the actual irradiation point might be somewhat deviated from the preset focal point. In this case, the focal depth is preferably set larger to some degree (within a range of a change amount of the optical path length). As a result, desired energy density for coating removal can be cumulatively applied by several sessions of rotary scanning.

If the trajectory of the irradiation point P becomes an oval shape, strictly speaking, the optical path length of the laser beam at each of the irradiation points on the trajectory becomes different from each other and thus, the present focal point might be deviated from a desired position. In this case, the focal depth is preferably set larger to some degree (within a range of a change amount of the optical path length) in advance. Since desired energy density for coating removal can be cumulatively applied in several sessions of rotary scanning, there is no problem even if the optical path length changes to some degree.

As described above, according to the laser head of the second embodiment, since the irradiation point of the laser beam is subjected to rotary scanning in a circular state around the optical axis intersection, by moving this laser head as appropriate, it becomes substantially planar scanning, and a coating in a wide range can be efficiently removed in a short time.

Moreover, since the wedge prism is used as a scanning element for deflecting the optical path of the laser beam, the optical path of the laser beam becomes simple without repeating reflection as compared with use of the optical element such as a galvano-mirror and thus, the scanning mechanism can be made small and simple. As a result, a small-sized laser head that can be handled at the work site can be realized with a low cost. Moreover, in such circular scanning, since the optical path length does not change, the configuration of the laser head can be made simple.

Moreover, the focal depth may be set large to some degree, whereby the coating removal treatment can be performed also for a surface of a structure with a protrusion, a step or a deep depth and a corner part of the structure. Moreover, required energy density for laser ablation can be applied in several sessions of circular scanning, and a coating can be efficiently removed. Furthermore, according to such circular scanning, if the laser beam is reflected from the surface, there is no concern that return light enters the laser head and damages the fiber 2.

Third Embodiment

In the above-described second embodiment, one wedge prism is used for the scanning optical system. On the other hand, in a third embodiment, a wedge prism rotatable around an optical axis and a deflecting means are used for the scanning optical system, and the laser beam is irradiated so as to have a conical shape flared to the end (may be partially hollow). The deflecting means may be a reflective optical element such as a mirror, but a permeable optical element such as a wedge prism is preferably employed. Hereinafter, a case in which the wedge prism is used as the deflecting means will be explained. A continuous trajectory of the irradiation point of the laser beam on the surface has a shape in which a second circle having a deflection amount of a second wedge prism (second wedge prism) as a radius continuously rotates around a moving point on a circumference of a first circle having a deflection amount of a first wedge prism (first wedge prism) as a radius. If the irradiation point of the laser beam is continuously scanned for a certain period of time while the optical axis is fixed to the surface, the continuous trajectory can be considered a substantially annular or circular plane, and substantially uniform laser irradiation can be realized.

FIG. 5 is an outline configuration diagram of the scanning optical system of the laser head of the third embodiment. This laser head 3B has a second wedge prism 45, a support member 46, and a transmitting means 47 as an additional configuration of the scanning optical system in addition to the configuration of the laser head 3A of the second embodiment. Moreover, the laser head 3 may have a shielding member (not shown) for protecting the scanning optical system from the removed matter generated from the laser irradiation point as necessary. In the laser head 3B of the third embodiment, the configurations similar to those in the laser head 3A of the second embodiment will be given the same reference numerals, and detailed explanation will be omitted.

The second wedge prism 45 deflects the optical path of the laser beam further by a deflection angle θ2 with respect to an optical path M (hereinafter also referred to as a rotation reference axis M) of the laser beam deflected by a deflection angle $\theta 1$ with respect to the optical axis L by the first wedge prism 43. The second wedge prism 45 is supported by the support member 46.

The transmitting means 47 links the support member 44 including the first wedge prism 43 and the support member 46 including the second wedge prism 45 with each other and transmits a driving force from the driving means 49. As the driving means 49, a gear mechanism for which an appropriate rotation ratio can be set may be used, for example.

In this embodiment, the first wedge prism 43 is rotated at a rotation speed $\omega 1$ by rotating the support member 44 around the optical axis L by the driving means 49, and the second wedge prism 45 is rotated at a rotation speed $\omega 2$ by rotating the support member 46 around the optical axis L via the transmitting means 47 linked with the support member 46.

Moreover, considering the surface 20 substantially perpendicular to the optical axis L, when the two wedge prisms are rotated around the optical axis L, an intersection Q between the surface 20 and the rotation reference axis M appears at the position of the distance r1 on the surface from the optical axis intersection O. And the irradiation point R (including the irradiation spot) appears at the position of the distance r2 on the surface from the intersection Q.

Note that the distance r1 is a deflection amount on the basis of the deflection angle $\theta 1$ of the first wedge prism 43 and the distance from the first wedge prism 43 to the surface 20 and the like, and the distance r2 is a deflection amount on the basis of the deflection angle $\theta 2$ of the second wedge prism 45 and the distance from the second wedge prism 45 to the surface 20 and the like.

In this figure, the configuration in which the driving means 49 directly applies a rotary driving force to the first wedge prism 43, and the transmitting means 47 indirectly applies a rotary driving force by the driving means 49 to the second wedge prism 45 was explained, but this is not limiting. Different rotary driving forces may be applied to the wedge prisms, respectively, by two driving means, or the rotary driving force directly applied to the transmitting means from the driving means may be applied to each of the wedge prisms. It is only necessary that the first wedge prism 43 and the second wedge prism 45 can rotate at different rotation speed.

FIG. 6 is an explanatory diagram illustrating an example of a trajectory on a treatment plane of the laser irradiation point according to the third embodiment. This figure illustrates a case in which the optical axis L and the surface 20 are substantially perpendicular, and the surface 20 is a substantially flat plane without curve or irregularity. Since the rotation reference axis M is a radius vector rotating around the optical axis L at the rotation speed $\omega 1$, the intersection Q between the rotation reference axis M and the surface 20 becomes a moving point (hereinafter also referred to as a moving point Q) moving at the rotation speed $\omega 1$ on the circumference of the circle C1 with the radius r1 around the optical axis intersection O. And an irradiation point R of the laser beam becomes a moving point moving at the rotation speed $\omega 2$ on the circumference of the circle C2 with the radius r2 around the moving point Q.

Note that in this figure, for explanation, the trajectory of the circle C2 when the rotation reference axis M makes a round, that is, when the moving point Q on the circle C1 makes a round is schematically illustrated, and the circle C2 apparently has a shape continuing around each point on the circle C1. However, actually, the moving point Q is moving on the circle C1 and the irradiation point R moves around it, and thus, the trajectory of the irradiation point R has a shape like a coil ring which is an open curve, not continuation of individual circles C2 which is a closed curve. More strictly, the trajectory of the irradiation point R becomes a trajectory of end point of a radius vector r2 further rotating at the rotation speed $\omega 2$ around the end point of the radius vector r1 rotating around the optical axis intersection O at the rotation speed $\omega 1$ (that is, the trajectory of the end point of the vector r (r1+r2).

Note that, the rotation speed $\omega 2$ is preferably set sufficiently larger than the rotation speed $\omega 1$, and a ratio between the rotation speed $\omega 1$ and the rotation speed $\omega 2$ (rotation ratio $\omega 2/\omega 1$) is preferably larger at least than 9/2.

Moreover, the rotation ratio ($\omega 2/\omega 1$) is preferably set so that an initial position of the irradiation point R does not match the position of the irradiation point R when the rotation reference axis M makes a single or several rounds. Then, even if the rotation reference axis M rotates several rounds, the C2 which is the trajectory of the irradiation point R does not overlap on the surface 20 and thus, substantially uniform scanning is made possible.

Moreover, while scanning of the shape of the circle C2 is performed, when the laser head 3B is moved in parallel with the surface 20 vertically or horizontally at a certain speed automatically or by operation of the worker, the irradiation point R can be scanned substantially uniformly with respect to a specific range of the surface 20, and a coating in the specific range on the surface 20 can be efficiently removed in a short time.

FIG. 7 is an explanatory diagram illustrating another example of the trajectory of the laser irradiation point by the laser head of the third embodiment. If scanning of the shape of the circle C2 is performed without moving the optical axis intersection O for a certain period of time, as illustrated in this figure, a coating in a region of a ring C3 with the circle C1 as a center curve can be also removed.

As described above, according to the laser head of the third embodiment, in addition to the effect of the second embodiment, since the irradiation point of the laser beam is scanned on an annular or circular plane, a coating in a specific range on the surface of the structure can be efficiently removed in a short time. This embodiment is suitable for removal of a coating in the periphery of a protrusion such as a bolt, for example.

Moreover, a radius of the center curve C1 and a width of the ring C3 are amounts depending on r1 and r2 corresponding to the deflection amounts of the wedge prism, respectively, and thus, by setting r1 and r2, that is, the deflection angle $\theta 1$ of the first wedge prism and the deflection angle $\theta 2$ of the second wedge prism as appropriate, a ring irradiation region with various sizes and shapes can be set, and a shape of a circle without a region for irradiation at a center part can be also set.

For example, when a coating in the periphery of a circular protrusion located on a plane to be treated is to be removed, if a region for irradiation is provided by setting the deflection angle $\theta 1$ and the deflection angle $\theta 2$ so that |r2−r1| becomes the radius of the circular protrusion, only the periphery of the circular projection can be scanned. Moreover, by setting r2≥r1, a shape not a ring but an entire circular surface without the region for irradiation at the center part can be also scanned.

Fourth Embodiment

As a fourth embodiment, a replaceable attachment mounted on a tip-end of the laser head will be explained below. This attachment has a deformable joint portion and a mirror with a changeable angle. As a result, the housing of the laser head can be brought into contact with the surface by an arbitrary angle with respect to the normal line of the surface. Thus, it is suitable for a complicated work site in which a sufficient work space cannot be ensured or an application for removing a coating on a periphery of a protrusion such as a bolt and a side surface of the protrusion itself.

Figure 8:
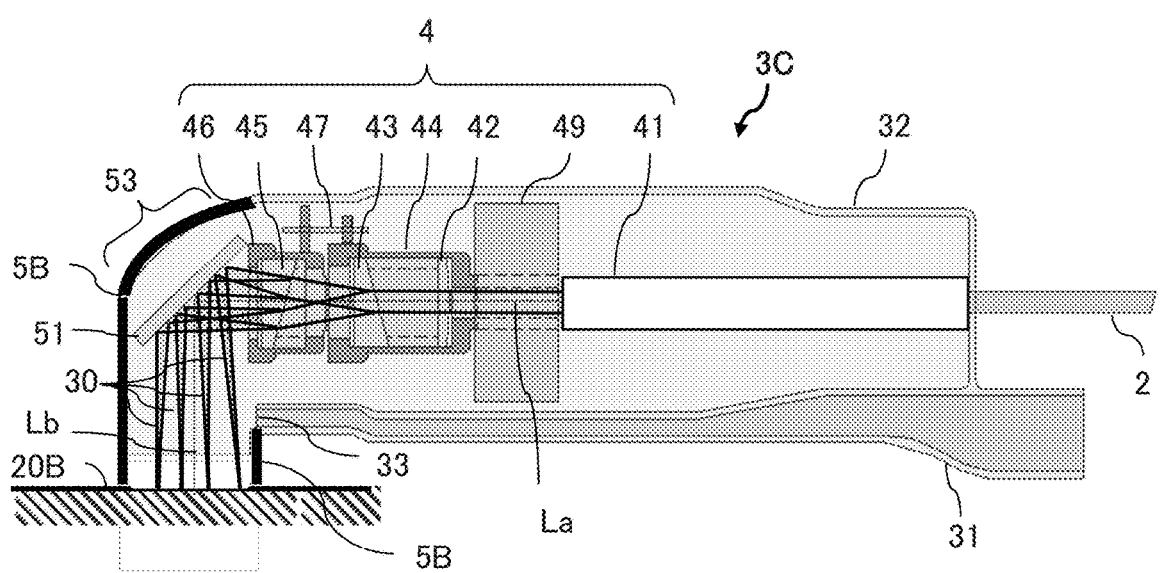
FIG. 8 is an explanatory diagram illustrating an attachment of a laser head of a fourth embodiment.

FIG. 8 is an outline configuration diagram of a laser head of the fourth embodiment. This attachment can be detachably attached to the tip-end of the housing 32 of the laser head and can be mounted on the laser head of the first to third embodiments. This figure is an example of being attached to the housing tip-end of the laser head (FIG. 5) of the third embodiment.

This attachment 5B has a deformable joint portion (flexible tube) 53 and is configured such that its own shape is deformable in accordance with an angle with respect to a normal line of a surface 20B. In this figure, the attachment 5B is configured such that a laser head 3C is substantially perpendicular to the normal line of the surface 20B. The attachment 5B has a first mirror 51 and a second mirror 52 (see FIG. 9). However, the second mirror 52 may be removed depending on an application (if the laser beam is not to be irradiated to a side surface of a protrusion, for example). Moreover, the laser head 3C may have a shielding member (not shown) for protecting a scanning optical system from a removed matter generated from the laser irradiation point.

The first mirror 51 is configured such that the angle of the normal line of the first mirror itself with respect to the optical axis L can be changed as appropriate. As a result, as illustrated, the irradiation direction of the laser beam can be changed to a direction of an incident axis Lb from an optical axis La. An angle between the optical axis La and the incident axis Lb can be set arbitrarily, and though not particularly limited, the angle is preferably set to 90°, for example. In this case, the trajectory of the irradiation point of the laser beam on the surface 20B is similar to the trajectory on the surface 20 perpendicular to the optical axis L illustrated in FIG. 6.

Figure 9:
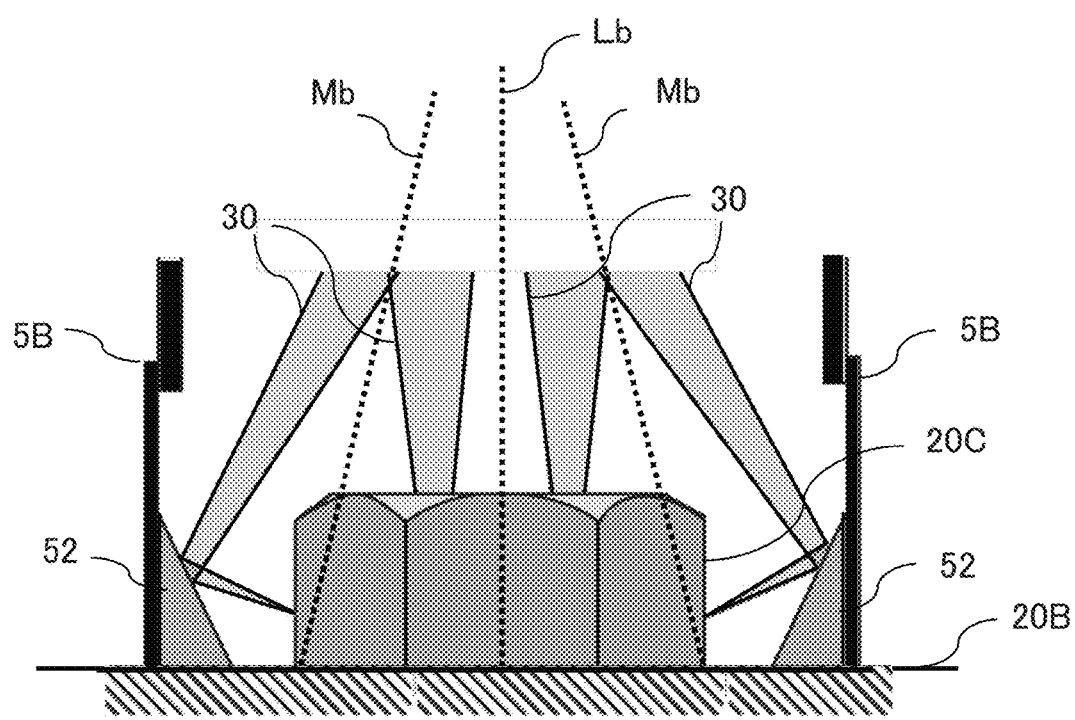
FIG. 9 is an explanatory diagram illustrating another example of the attachment of the fourth embodiment.

FIG. 9 is an outline configuration diagram of a part of the attachment of the fourth embodiment and illustrates it together with an optical path of the laser beam of the laser head 3C. As illustrated in the figure, there is a protrusion 20C (a bolt, for example) on the surface 20B, and the laser beam 30 enters while rotating around the rotation reference axis Mb rotating around the incident axis Lb deflected by the first mirror 51. The laser beam 30 closer to the incident axis Lb is irradiated to an upper surface of the bolt 20C, while the laser beam 30 farther from the incident axis Lb is reflected by the second mirror 52 provided on the attachment 5B and is irradiated to a side surface of the bolt 20C. As described above, by using this attachment, coating removal around the protrusion which has been difficult can be easily performed.

As described above, according to the attachment of this embodiment, since the laser head can be brought into contact with the surface in an arbitrary orientation, the removing work can be easily performed even in a complicated and narrow structure in which handling is limited without a need for the worker to take a forced attitude. Moreover, by mounting this attachment to the laser head of the third embodiment, a coating around the protrusion on the surface and the side surface of the protrusion itself can be efficiently treated.

Figure 10:
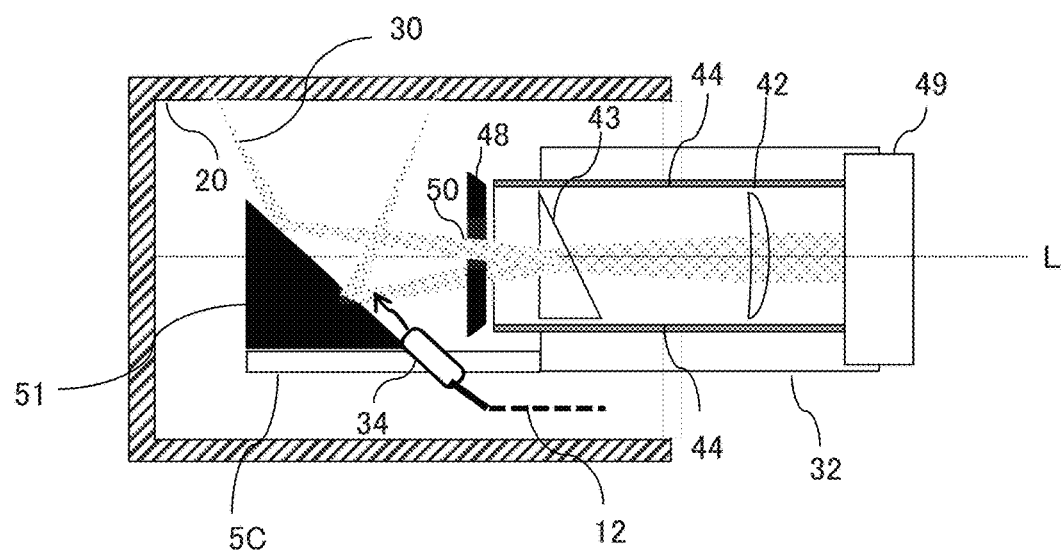
FIG. 10 is an explanatory diagram illustrating still another example of the attachment of the laser head of the fourth embodiment.

FIG. 10 is an explanatory diagram illustrating still another example of the attachment of the laser head of the fourth embodiment. This example is a mode in which an attachment including a reflective mirror is mounted at a tip-end of the laser head provided with the scanning optical system illustrated in FIG. 3. This example has a simpler structure and can be used in a narrow part of a structure, for example, and can remove a coating, an adhering substance and the like on the surface at a complicated spot, which has not been realized in a conventional blast method.

An attachment 5C is connected to a tip-end of the laser head housing 32, and the reflective mirror 51 is provided on the tip-end at a predetermined angle. The laser beam 30 irradiated having a conical shape from the scanning optical system of the laser head is reflected by the reflective mirror 51, and the laser irradiation point is scanned substantially circularly on an inner-side surface of the narrow part of the structure. The shielding member 48 for protecting the optical member (a prism, a lens, a mirror and the like) arranged on the emitting end side from the removed matter generated from the laser irradiation point is preferably provided on an emitting end of the scanning optical system. The shielding member 48 has a flat-plate shape, for example, and an emitting port 50 of the laser beam and is configured to rotate with rotation of the scanning optical system.

Moreover, in the attachment 5C, in order to protect the reflective mirror 51 from the removed matter generated from the laser irradiation point, the gas blowing means 34 for supplying a gas flow to the reflective mirror 51 may be provided. The gas blowing means 34 blows the gas force-fed from the gas supply source, not shown, via the gas hose 12 to the vicinity of the surface of the reflective mirror 51 and prevents adhesion of the scattered removed matter to the reflective mirror 51.

Fifth Embodiment

An example in which a sensor group and the like are provided in the laser head of the first to fourth embodiments will be explained below.

Figure 11:
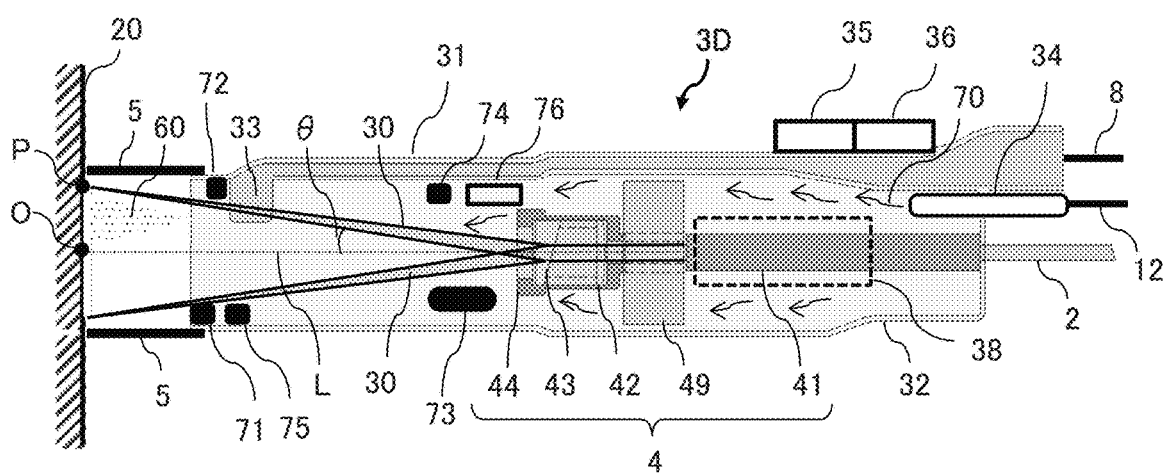
FIG. 11 is an outline configuration diagram of a laser head of a fifth embodiment.

FIG. 11 is an outline configuration diagram of a laser head of a fifth embodiment. This laser head is provided with various sensors as the sensor group 7 such as a contact proximity sensor 71, a surface state sensor 72, a monitoring sensor 73, a vibration detection sensor 74, an inter-surface distance measurement sensor 75 and the like. Note that the laser head does not have to be provided with all of the sensor group 7, and the sensor group 7 may be employed by selection according to a purpose or one sensor may serve a plurality of functions.

The contact proximity sensor 71 is a sensor for detecting that the attachment 5 is in contact or approaching the surface 20. For such a sensor, a pressure sensor mounted at a contact portion at the tip-end of the attachment with the surface to be treated, a sensor for measuring reflection strength of an emitted electric wave and the like, for example, can be used or it may be so configured that contact with or proximity to the attachment is detected. The control unit 35 (it may be a management terminal (see reference numeral 82 in FIG. 14) separate from the laser head. The same applies to the following) can also control such that irradiation of the laser beam is not allowed unless detection is made by such a sensor. As a result, the laser beam is prevented from being emitted to other than the surface to be a target of the coating removal by mistake, and safety of the worker can be ensured. Moreover, in the case of a sensor for measuring the reflection strength of the emitted electric wave, it may be so configured that irradiation of the laser beam is allowed only if the reflection strength exceeds a predetermined value. As a result, erroneous emission of the laser beam to human bodies and the like can be prevented.

The surface state sensor 72 detects a material (steel plate, aluminum and the like) of an undercoat of the surface 20, a state of a coating (floating, thickness), a rust state (area, degree), a corrosive substance, a stain, an adhesion state of fat and oil and the like. Moreover, a removed amount of a coating and the like may be detected. Specifically, a radiation temperature sensor, a visible-area spectroscopic image sensor, a near-infrared camera and the like can be employed. The monitoring sensor 73 is, for example, a CCD camera, a CMOS camera and the like. As a result, the worker or an administrator and the like located at a place far from the work site can observe the state of the surface and a state inside the laser head and can obtain information for determining a degree of required coating removal or necessity of maintenance. The control unit 35 can collect information relating to the state of the surface detected by such a sensor (hereinafter referred to as "surface-state information"). Moreover, the control unit 35 may control such that this surface-state information is displayed on the display apparatus of the operating unit 36. Alternatively, this surface-state information may be notified to the display apparatus (reference numeral 82 in FIG. 14) connected to the laser head 3D main body wirelessly or by wire. Moreover, the surface-state information may be transmitted to a server connected to this laser irradiation apparatus wirelessly or by wire. The control unit 35 may change the laser irradiation condition on the basis of the detected surface-state information or may re-set the laser irradiation condition on the basis of an instruction inputted by the worker on the basis of the surface-state information. Moreover, the laser irradiation condition suitable for the coating removal at the site is selected on the basis of the obtained surface-state information, and each setting of the laser irradiation apparatus including the laser head may be changed on the basis of the selected laser irradiation condition.

Moreover, a sensor capable of detecting a toxic reaction gas may be provided inside the attachment (not shown). The control unit 35 may be configured to issue an alarm to the worker and the administrator when occurrence of the toxic gas is detected.

The inter-surface distance measuring sensor 75 is a sensor for measuring a distance to the surface by infrared rays and the like. The control unit 35 can set the focal point at a position suitable for the coating removal on the basis of the inter-surface distance detected by such a sensor. Specifically, when the attachment 5 is in contact, the expansion/contraction mechanism of the attachment 5 is controlled so that the surface 20 to be treated is arranged at a distance equal to or closer than the focal distance of the laser beam. Moreover, the variable focusing mechanism of the optical system is controlled so that the focal distance of the laser beam becomes equal to or longer than the measured inter-surface distance.

Figure 12:
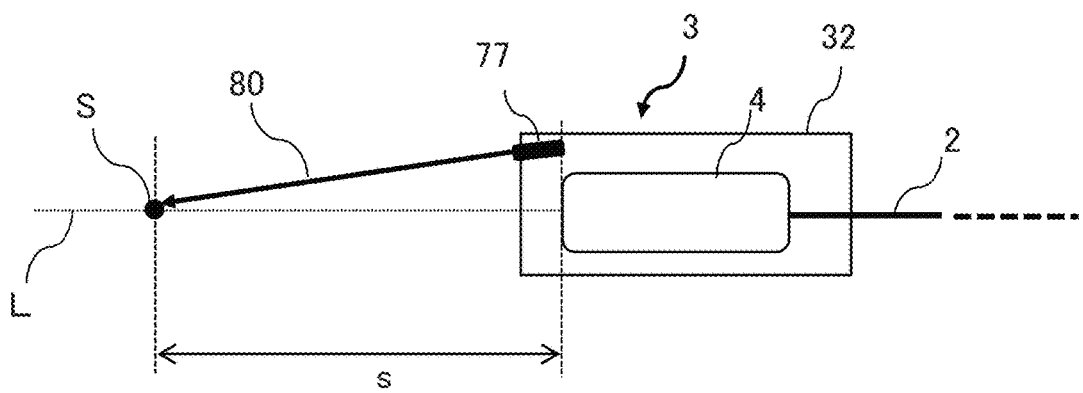
FIG. 12 is an example of a distance measurement means of the laser head of the fifth embodiment.
Figure 13:
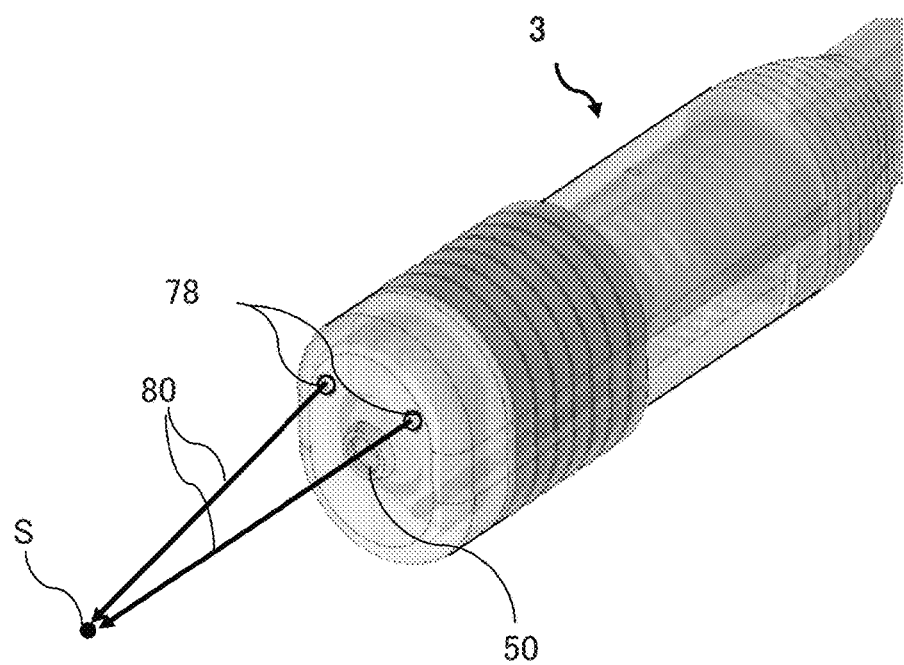
FIG. 13 is an example of a focal point by the distance measurement means of the laser head of the fifth embodiment.

Furthermore, as the inter-surface distance measuring means, an irradiation means (laser pointer or the like) using red laser may be used. FIG. 12 is an example of arrangement of the laser pointer in the laser head, and FIG. 13 is an example of pointing of a focal point by the laser pointer. In FIGS. 12 and 13, two laser pointers 77 are provided in the laser head as the inter-surface distance measuring means (only one on the front is shown in FIG. 12). Each of the laser pointers 77 is arranged so that its red laser beam 80 is irradiated diagonally to the optical axis of the scanning optical system 4 and crosses the red laser beam from the other laser pointer 77 at a predetermined distance (position) s. In FIG. 12, they are arranged so as to cross each other at a position S on the optical axis L of the scanning optical system 4 and are configured to be a guide of the inter-surface distance and so that a center of the irradiation point of the laser beam can be grasped. As described above, by setting the distance s to a desired inter-surface distance, the irradiation position of the laser head can be grasped. Note that the red laser beams from the laser pointers 77 do not have to cross each other on the optical axis of the scanning optical system 4 and may be arranged so as to cross each other at another position (a predetermined position on a front of the laser pointer 77, for example). Moreover, three or more laser pointers may be provided.

FIG. 13 illustrates a state in which the red laser beams 80 from the two laser pointers are irradiated from two emitting ports 78 provided on a tip-end cap of the laser head 3 and cross each other at the position S. By irradiating the red laser beams to the surface to be treated by such two laser pointers, the worker can know an expected inter-surface distance from the principal point of the optical system to the surface when moving the laser head longitudinally with respect the surface to be treated from the distance between the two light points of the laser pointers, and if the two light points match each other, for example, the worker can confirm that the laser head is at the appropriate inter-surface distance.

By referring to FIG. 11, the vibration detection sensor 74 is to detect vibration of the laser head 3D held by the worker and may be an acceleration sensor, for example. Moreover, this laser head 3D may be provided with a vibrating means 76 for vibrating the laser head body. For the vibrating means, a vibration motor, a camera shake preventing mechanism mounted on a general camera and the like can be used. If the laser beam 30 is continuously irradiated to a specific portion in a coating removal work, only the portion might be drilled deep. The control unit 35 preferably controls such that, if intensity of vibration detected by the vibration detection sensor 74 becomes smaller than a predetermined reference, the irradiation point P of the laser beam is vibrated finely by vibrating the laser head body 3D or the scanning optical system 4 by using the vibrating means 76 so that the specific portion is not drilled too deep.

Moreover, the control unit 35 may notify the worker that the focal point is at an appropriate position by the vibrating means 76 or the display apparatus of the operating unit if it determines that the desired position of the focal point is obtained on the basis of measurement of the inter-surface distance by the inter-surface distance measurement sensor 75. Furthermore, the control unit 35 may stop irradiation of the laser beam if it is determined that the focal point is not at a desired position on the basis of the measured inter-surface distance. If the attachment is mounted, the worker cannot usually check the irradiation point of the laser beam. The worker can check the optimal position by vibration or display, which is preferable.

Moreover, in this embodiment, it may be so configured that the fiber connection portion 41 (laser emitting collimator) has a light collecting function. In general, the collimator has a function of converting incident light to parallel light, and it may be so configured that the focusing laser beam 30 can be emitted by incorporating a light collecting lens in this collimator. As a result, size and cost reduction of the laser head can be realized. Moreover, since the fiber connection portion 41 (laser emitting collimator) is a final irradiation member of the fiber, heat can be easily accumulated. Thus, in order to prevent overheat of the fiber connection portion 41, a cooling means 38 may be arranged in the periphery. The cooling means 38 may be air-cooling or water-cooling. For the cooling means 38, it may be so configured that the gas blowing means 34 disposed in the housing 32 is used to blow the gas press-fed from the gas supply source via the gas hose 12 to the fiber connection portion 41. Moreover, the gas blowing means 34 may be configured so that inflow of the removed matter generated from the irradiation point P into the housing and contamination of the optical member inside the housing and the scanning optical system 4 are prevented by filling the inside of the housing with a gas flow (purge gas). The gas blowing means 34 can be also used as the antistatic means as described above, and by supplying the purge gas that can remove static electricity (including ion, for example) to the inside of the laser head so as to remove the charge from the removed matter charged with static electricity. Moreover, in this embodiment, instead of the gas blowing means 34 or in addition to the gas blowing means 34, a shielding member (not shown) for protecting the scanning optical system from the removed matter generated from the laser irradiation point may be provided.

The laser irradiation apparatus including the laser head having the various sensors of this embodiment may be connected to an external server via a network. The server can store various types of information obtained by the various sensors, select conditions of laser irradiation on the basis of the various types of information and instruct an optimal condition to the laser irradiation apparatus located at a remote site. A system provided with the laser irradiation apparatus will be explained below.

Sixth Embodiment

Figure 14:
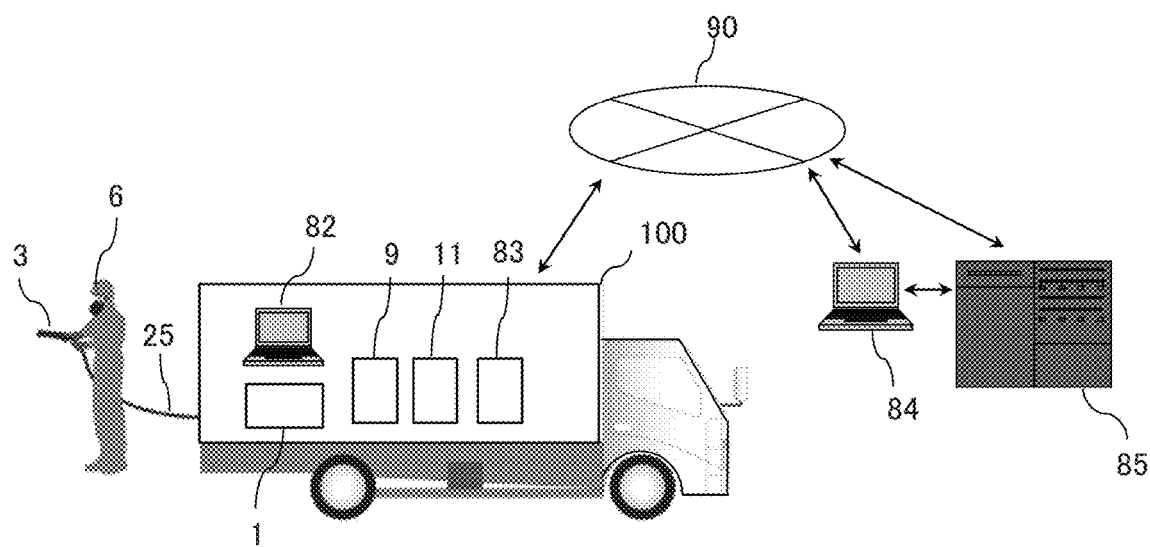
FIG. 14 is an outline diagram illustrating a laser irradiation system of a sixth embodiment.

FIG. 14 is an outline diagram illustrating an entire configuration of a laser irradiation system of a sixth embodiment. The laser irradiation system connects the laser irradiation apparatus arranged at a work site and a server placed at a remote site to each other via a network, sets a laser irradiation condition on the basis of information of the coating state obtained by the laser irradiation apparatus and the like and realizes an efficient coating work according to a state of the structure surface.

This system is provided with the laser irradiation apparatus including the small-sized and light-weighted laser head 3 used at a work site and a server, and both are connected to each other via a network. In the laser irradiation apparatus, the laser head 3 used at a work site is connected to various apparatuses mounted on a vehicle 100 arranged in the vicinity of the work site via the integrated cable 25 (including the fiber 2, the suction hose 8, the gas hose 12, and a power cable). The vehicle 100 is preferably a runnable vehicle but in addition, a boat, a barge, a carriage configured to be movable via a rail or a cable, and a platform capable of autonomous running by a remote control may be used. On the vehicle 100, the laser oscillator 1, the suction source 9, and the gas supply source 11 are mounted similarly to FIG. 1 and in addition, a management terminal 82, a power supply apparatus 83 and the like are mounted.

The management terminal 82 is a terminal for controlling the laser irradiation apparatus and has a function of creating information relating to a state of a surface (surface-state information) by obtaining information from the various sensors mounted on the laser head 3, a function of creating information relating to maintenance management of the laser irradiation apparatus (hereinafter referred to as "apparatus management information"), a function of managing the laser irradiation condition, a function of displaying various types of information, a function of communicating with a server 84 via the network and the like. For the management terminal 82, the control unit of the laser head 3, a personal computer and the like can be employed, for example. The power supply apparatus 83 supplies power to each of the apparatuses in the vehicle and the laser head 3.

The server 84 is a server managing a plurality of the laser irradiation apparatuses and has a function of storing various types of information obtained from the management terminal 82 via a network 90, a function of setting the laser irradiation condition for efficient coating removal according to the work site or the surface of the target on the basis of the surface-state information and the like, a function of transmitting such irradiation conditions to each of the laser irradiation apparatuses via the network 90, a function of maintaining/managing each of the laser irradiation apparatuses on the basis of the apparatus management information, and the like.

Moreover, this system may be provided with a management terminal 85. The management terminal 85 is a terminal for managing the server 84, and a personal computer or the like can be employed, for example. The management terminal 85 may be directly connected to the server 84 or may be connected to the server 84 and the management terminal 82 via the network. Administrators can access the server 84 and the management terminal 82 of the laser irradiation apparatus via the management terminal 85.

It is only necessary that the network 90 allows the management terminal 82 of the laser irradiation apparatus (or a communication apparatus, not shown) and the server 84 to be communicable with each other. For example, a public telephone network, ISDN (Integrated Service Digital Network. Also referred to as Digital Integrated Service Network), ADSL (Asymmetric Digital Subscriber Line), CATV (Community Antenna TeleVision) network, an optical fiber network, a wireless LAN (Local Area Network), CS (Communication Satellite) broadcasting, a mobile phone network and the like can be used.

The apparatus management information includes, for example, identification information, model, use situation (use time and date, cumulative use time, use frequency, use condition, component replacement history) of the laser head 3 and the like. The surface-state information includes information relating to the state of the coating (thickness of the coating, an area of an active film, a state of rust and stain, closeness (moisture)), quality of a base material (undercoat), a shape of the target surface (plane, a corner part, a protrusion), and a type of a structure (a bridge, a tank and the like). Moreover, such surface-state information may be associated to the laser irradiation condition when the surface is actually subjected to coating removal (a laser output, a laser wavelength, a focal distance, a defocusing amount, a spot diameter, a mode of scanning (a rotation speed, a scanning speed), energy density, a removed amount and the like), information relating to the surface of the structure after the laser irradiation, and a weather condition (a temperature, humidity and the like).

The server 84 of this system can select the appropriate laser irradiation condition according to the state of the surface of each work site on the basis of the obtained surface-state information and/or past achievements of the laser irradiation and transmit the selected laser irradiation condition to each of the laser irradiation apparatuses. Moreover, the server 84 may have a function of creating a database by associating the surface-state information with the laser irradiation condition. Moreover, the server 84 may be configured to transmit a signal for allowing or prohibiting irradiation of the laser beam to the laser irradiation apparatus on the basis of information from the sensor group (contact of the attachment, the inter-surface distance, the surface state and the like). Furthermore, the server 84 may notify or manage timing and contents of the maintenance on the basis of the apparatus management information obtained from each of the laser apparatuses.

As a method in which the laser irradiation apparatus obtains a laser irradiation condition from the server 84, a configuration using operation on the laser irradiation apparatus-side as a trigger may be employed, or the laser irradiation condition may be provided to the laser irradiation apparatus from the server 84 independently from the operation on the laser irradiation apparatus-side. Specifically, if there is operation on the laser irradiation apparatus-side such as transmission of the surface-state information, a condition delivery request inputted from the worker, power-on of the laser head and the like, the server 84 obtains the surface-state information and selects an appropriate laser irradiation condition on the basis of such surface-state information and transmits the selected condition to the laser irradiation apparatus at the work site. Moreover, the server 84 may obtain various types of information stored in the management terminal 82 of the laser irradiation apparatus independently from the operation on the laser irradiation apparatus-side on the basis of the identification information registered in advance and the like, select the appropriate laser irradiation condition on the basis of them and store the selected condition in the management terminal 82 of the laser irradiation apparatus. Note that, in the above-described explanation, the case in which the server 84 transmits the laser irradiation condition is explained, but a configuration in which the management terminal 82 of the laser irradiation apparatus obtains the laser irradiation condition stored in the server 84 may be employed.

The management terminal 82 (or the control unit 35) may automatically make setting of the irradiation apparatus on the basis of the obtained laser irradiation condition. Moreover, it may display the obtained laser irradiation condition on a display portion of the management terminal 82 or the operating unit 36 of the laser head 3, for example. Moreover, it may be so configured that the worker can adjust various settings manually and the laser irradiation condition can be changed as appropriate in accordance with a change in the situation of the site. Note that, from the viewpoint of safety management, an adjustable range (a maximum value of an output and the like) is preferably limited.

Moreover, the administrator may determine a grade of coating removal and notify the grade to the worker of the work site on the basis of the surface-state information and a result of visual observation by a camera. In re-painting of a structure, a required grade of coating removal is classified to Class 1 scraping to Class 4 scraping. For example, in the Class 1 scraping, a coating, rusts and the like on the surface are fully removed, and a surface of iron of metallic luster is fully exposed. In the Class 2 scraping, a firmly adhering coating is removed, and other coatings, corrosive substances, fat and oil, stains and other foreign substances are removed. In the Class 3 scraping, rusts and floating coatings are removed, while an active film is left. In re-painting of the structure, the Class 2 scraping and the Class 3 scraping are generally used, but the Class 1 scraping is employed in many cases for structures with remarkable coating deterioration of a steel material in recent years.

As described above, according to this embodiment, the server can select and instruct a laser irradiation condition suitable for coating removal to the laser irradiation apparatus on the basis of information detected by the various sensors mounted on the laser head.

Seventh Embodiment

In this embodiment, another example of the circular scanning of the laser beam is explained, which is a mode in which the focusing laser beam is deflected so as to have a circular trajectory and then, deflected again in the optical axis direction in order to irradiate so that the optical path of the laser beam crosses at the optical axis.

Figure 15:
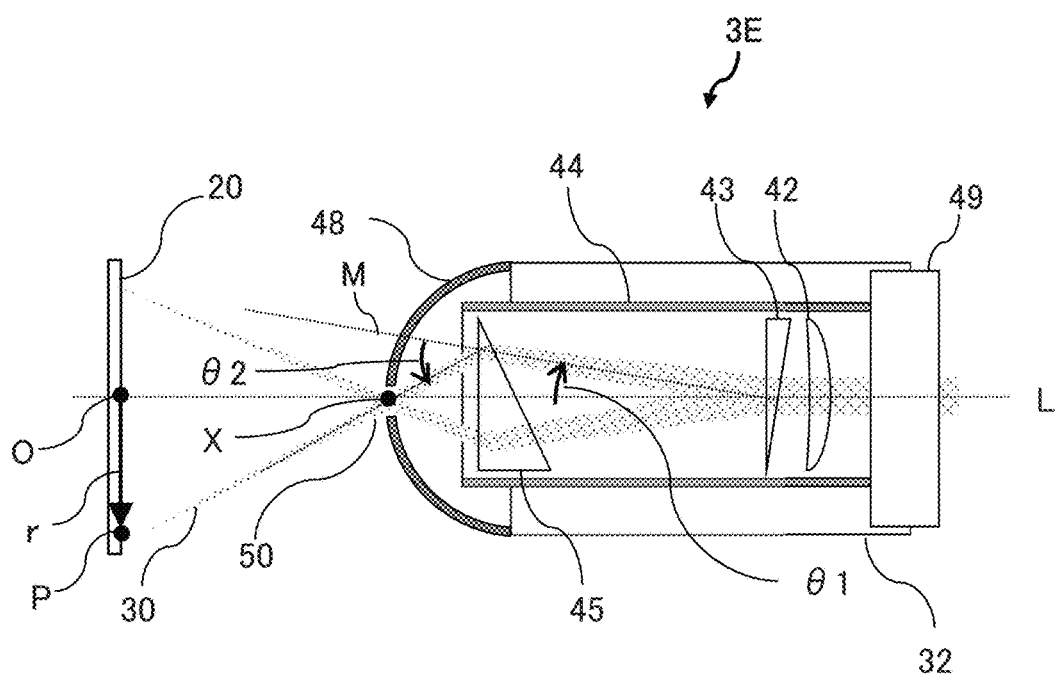
FIG. 15 is an outline configuration diagram illustrating an example of a laser head of a seventh embodiment.

FIG. 15 is an outline configuration diagram illustrating an example of a laser head of a seventh embodiment. This laser head 3E is different from the laser head 3B of the third embodiment illustrated in FIG. 5 in a point that the first wedge prism 43 and the second wedge prism 45 are fixed and provided on the support member 44 so that a rotation difference is not generated in each prism and in a point in which a dome-shaped shielding member 48 having the laser emitting port 50 on the optical axis is provided. In the laser head 3E of the seventh embodiment, the same configurations as those in the laser head 3B of the third embodiment are given the same reference numerals and detailed explanation will be omitted.

In this example, the first wedge prism 43 and the second wedge prism 45 are supported by the support member 44, and the first wedge prism 43 and the second wedge prism 45 are rotated around the optical axis together (at the same rotation speed) by driving force from the driving means 49.

The first wedge prism 43 deflects the optical path of the laser beam with respect to the optical axis L by the deflection angle 1 in the direction outward from the rotation center (optical axis L). Subsequently, the second wedge prism 45 deflects the optical path of the laser beam with respect to the deflected optical path M by the deflection angle $\theta 2$ in the direction toward the rotation center (optical axis L) (wherein $\theta 2 > \theta 1$). In this example, since the laser beam having been deflected outward with respect to the optical axis L once is deflected again inward, the laser beams apparently cross at an intersection X in accordance with motions of the two prisms rotating integrally. In other words, this example is a configuration in which the laser beam 30 is irradiated from the intersection X with an angle ($\theta 2 - \theta 1$) from the optical axis L.

As described above, in this example, since the emitting port 50 of the shielding member 48 is arranged in correspondence with a position of the intersection X of the laser beam, the emitting port in the shielding member 48 can be set small on the optical axis, and entry of the removed matter generated from the irradiation point of the laser beam on the treatment plane into the laser head can be prevented while the laser beam is irradiated circularly. Note that, in this example, a third wedge prism may be provided on the positive side (on the side of the surface to be treated in the figure), and the third wedge prism may be rotated at a rotation speed different from those of the first and second wedge prisms. In this case, the mode of the circular scanning as illustrated in FIG. 5 can be realized. Note that, though this embodiment is not configured to collect the removed matter generated from the laser irradiation point P, if the removed matter is not to be scattered to the periphery, an attachment and a suctioning means may be further provided.

Figure 16:
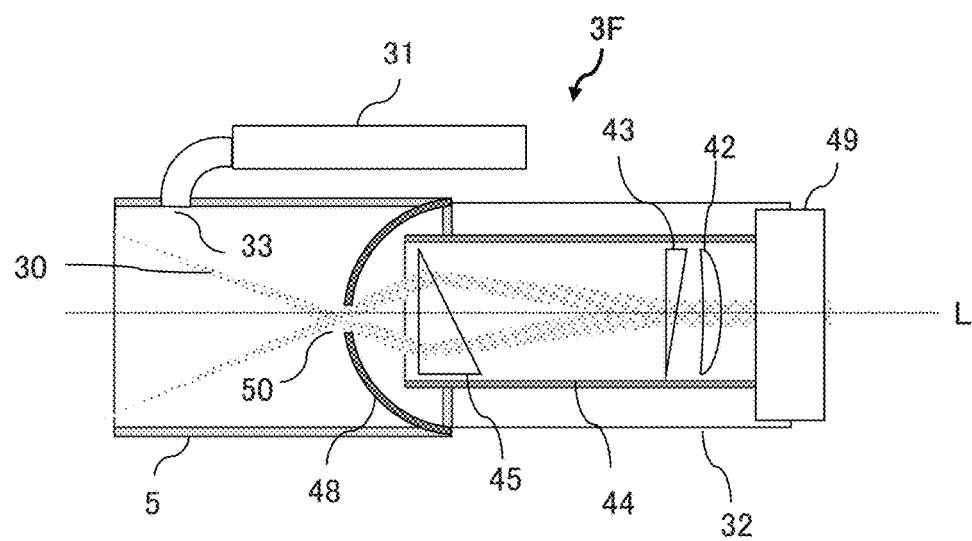
FIG. 16 is an outline configuration diagram illustrating another example of the laser head of the seventh embodiment.

FIG. 16 is an outline configuration diagram illustrating another example of the laser head of the seventh embodiment. The laser head 3F of this example is provided with the suctioning means 31 having the attachment 5 and the suction port 33 as an additional configuration to the laser head 3E illustrated in FIG. 15. According to the laser head of this example, the optical system of the laser head can be protected from the removed matter generated from the irradiation point of the laser beam and the removed matter can be collected without scattering to the periphery.

Eighth Embodiment

In an aspect of the present invention, a variation when an adhering matter inside a pipeline is to be removed will be explained. In this example, the laser beam is not irradiated circularly to a plane surface to be treated but the laser beam is irradiated circularly in accordance with an inner diameter of the inside of the pipeline. This example is particularly suitable for an application for removing an adhering matter containing a radioactive substance inside a secondary cooling pipeline of a nuclear reactor.

Figure 17:
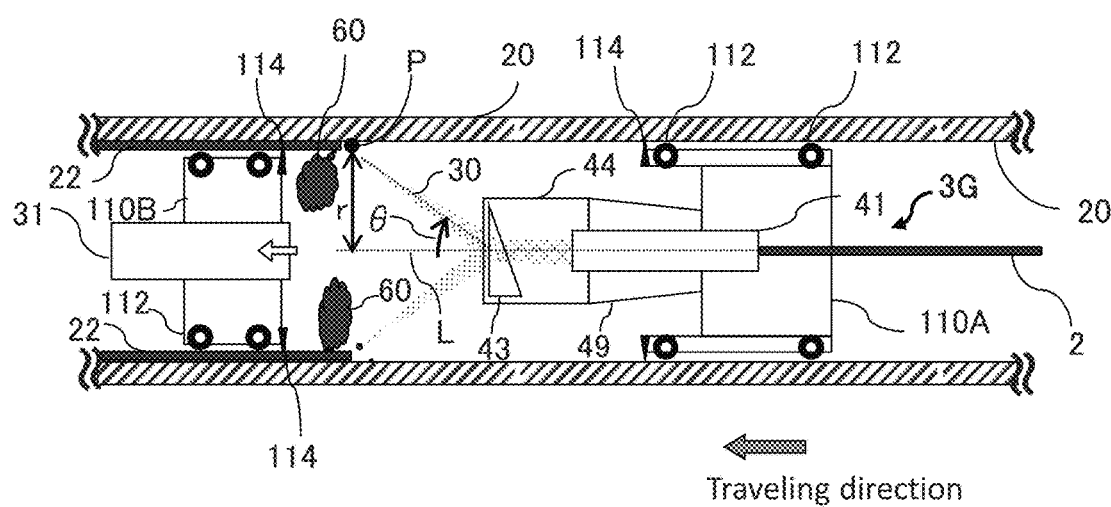
FIG. 17 is an outline configuration diagram illustrating an example of a laser head of an eighth embodiment.

FIG. 17 is an outline configuration diagram illustrating an example of a laser head of an eighth embodiment. A laser head 3G of this example includes the wedge prism 43, the support member 44, the driving means 49, the fiber connection portion 41, the suctioning means 31 having the suction port 33, and a moving means 110. Since this laser head 3G is used by being inserted into a pipeline with a small diameter, it is preferably made as small as possible, and the fiber connection portion 41 can preferably supply the laser beam with high energy as it is from the emitting end without using a focusing means.

Main bodies (41, 43, 44, 49) of the laser head 3G are placed on a moving means 110A capable of running automatically or manually inside a pipeline 20, and the suctioning means 31 is placed on a moving means 110B arranged in a traveling direction of the laser head body. Each of the moving means 110A and 110B can have a roller 112 for traveling and an appropriate driving means (not shown) and move along the inside of the pipeline, for example. The moving means 110A and 110B are preferably configured to be movable by remote control.

Moreover, in the moving means 110A and 110B, a sealing means 114 capable of close contact with the surface of the inside of the pipeline is preferably provided. The sealing means is constituted by rubber or resin packing, brush or the like. As a result, since a space between the moving means 110A and the moving means 110B is closed, scattering of harmful removed matters and the like removed by the laser irradiation can be prevented.

The laser head 3G irradiates the laser beam 30 circularly in accordance with an inner diameter of the pipeline 20 while traveling in the pipeline by the moving means 110A. That is, since the irradiation point P of the laser beam is scanned so as to draw a trajectory of a circle having a radius r corresponding to ½ of the inner diameter of the pipeline, the adhering matter 22 inside the pipeline can be efficiently removed. The moving means 110B on which the suctioning means 31 is placed travels together with the moving means 110A on which the laser head body is placed, and the removed matter 60 generated from the irradiation point of the laser beam 30 is collected by the suctioning means 31.

Figure 18:
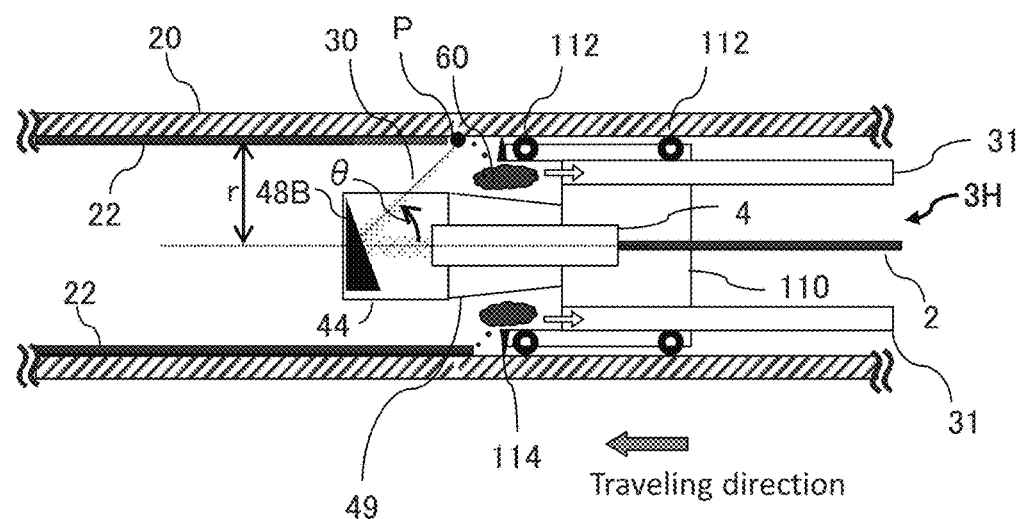
FIG. 18 is an outline configuration diagram illustrating another example of the laser head of the eighth embodiment.

FIG. 18 is an outline configuration diagram illustrating another example of the laser head of the eighth embodiment. The laser head 3H of this example is different from the example illustrated in FIG. 17 in a point that a reflective mirror 43B is used instead of the wedge prism, and the suctioning means 31 is provided on the main body side of the laser head. The reflective mirror 43B is provided on the tip-end of the laser head and rotated by the driving means 49. In this laser head 3H, the laser beam 30 emitted from the fiber connection portion (laser emitting collimator) 41 is reflected by the predetermined angle θ by the rotating reflective mirror 43B. The reflected laser beam 30 goes to the rear of the tip-end of the laser head. The irradiation point P of the laser beam is scanned so as to draw the trajectory of the circle having the radius r corresponding to ½ of the inner diameter of the pipeline, and thus, the adhering matter 22 inside the pipeline can be efficiently removed. The removed matter 60 generated from the irradiation point of the laser beam 30 is collected by the suctioning means 31 placed on the moving means 110.

According to this example, the laser head can travel inside the pipeline and scan the irradiation point of the laser beam circularly conforming to the inner diameter of the pipeline and thus, removal of the adhering matter inside the pipeline which has been difficult can be performed efficiently and safely.

Note that FIG. 17 illustrates the configuration in which one wedge prism is used as the scanning optical system and FIG. 18 illustrates the configuration in which one reflective mirror is used as the scanning optical system, but the laser head of the eighth embodiment is not limited to those configurations. The configurations of the other embodiments (FIGS. 1, 3, 5, 8, 15, 16 and the like, for example) may be combined with the laser head in FIG. 17 or FIG. 18.

Ninth Embodiment

In this embodiment, a laser head including a replaceable optical unit will be explained. FIG. 19(A) is an outline configuration diagram of the scanning optical system (when connected) including the replaceable optical unit in a laser head of a ninth embodiment, and FIG. 19(B) is an outline configuration diagram when the replaceable optical unit is removed (when separated). The scanning optical system of the laser head of this embodiment is constituted by connecting a replaceable optical unit 190 including an optical member at least for focusing or deflecting and a body portion 191 including at least the driving means 49 (see FIG. 19(A)), and the replaceable optical unit 190 is configured to be detachably attached to the body portion 191 of the laser head with simple operation (see FIG. 19(B)), and an irradiation condition of the laser beam can be easily changed.

Figure 19:
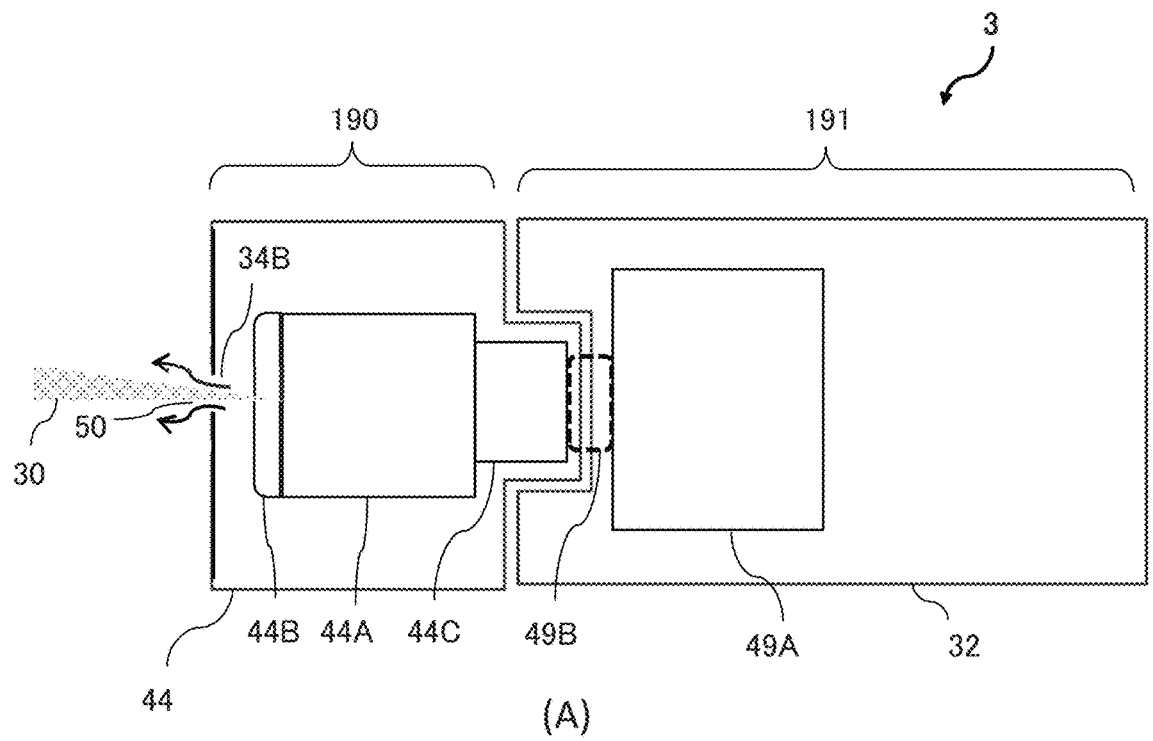
FIG. 19 are outline configuration diagrams illustrating a scanning optical system including a replaceable optical unit of a ninth embodiment, showing the replaceable optical unit connected (panel (A)) and separated (panel (B)).
Figure 19:
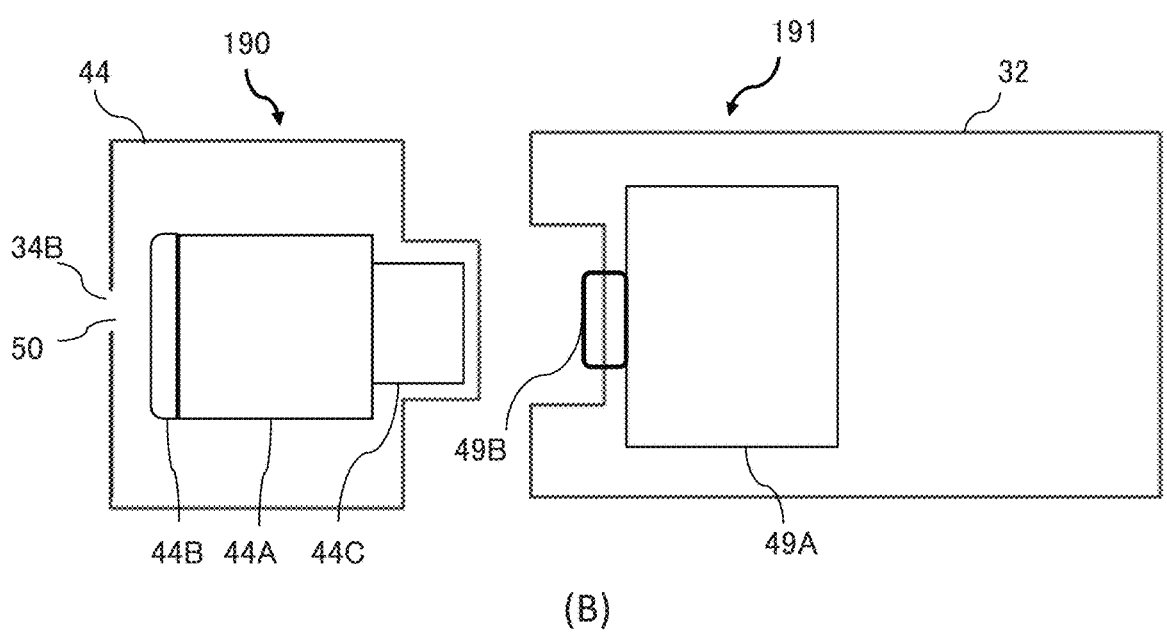

The replaceable optical unit 190 is a unit including various optical members (one or more of a wedge prism, a light collecting lens, a reflective mirror and the like, for example) and at least a part of or a whole of the replaceable optical unit 190 is made rotatable by driving force applied by the driving means 49. In FIG. 19, it is constituted by the support member 44 rotatably holding a lens holder body 44A, a lens cap 44B, a joint cap 44C and the like. The lens holder body 44A stores various optical members therein and is closed by the lens cap 44B on the front and by the joint cap 44C on the rear. It is only necessary that the optical members requiring conditional changes are arranged in the replaceable optical unit, while the other optical members may be arranged in the body portion 191. The lens cap 44B has an opening through which the laser beam passes. The joint cap 44C has an opening through which the laser beam passes provided and has a structure engaged with a connecting member 49B of the body portion 191 so that a rotating force of the driving means can be transmitted. Thus, at least a part of the replaceable optical unit 190 can be rotated by the driving force applied by the driving means 49 but can be separated from the body portion 191 including the driving means 49 by simple operation and can be removed from the laser head.

Moreover, on a tip-end of the replaceable optical unit 190, the laser emitting port 50 for emitting the laser beam is provided. The laser beam emitted from the replaceable optical unit 190 is circularly scanned by the various optical members stored in the lens holder body 44A, for example, and emitted toward the surface to be treated from the laser emitting port 50. Moreover, in order to prevent entry of the removed matter into the optical unit 190, the gas supplied form the gas supply source (not shown) may be injected from the laser emitting port 50. Note that a gas blow-out port 34B may be provided instead of the laser emitting port 50 or in addition to the laser emitting port 50 in the periphery of the laser emitting port 50 so that the gas supplied from the gas supply source (not shown) is injected. Moreover, in the replaceable optical unit 190, a laser pointer (reference numeral 77 illustrated in FIG. 12) may be arranged, and a hole of the laser pointer (reference numeral 78 illustrated in FIG. 12) may be provided. The body portion 191 is constituted by a hollow motor 49A which is the driving means 49, the connecting member 49B and the like.

As a method for connecting the replaceable optical unit 190 to the body portion 191, the joint cap 44C of the replaceable optical unit 190 and the connecting member 49B of the body portion 191 may be fixed via a hook or the like, for example, so that the driving force by the driving means 49 is transmitted to the replaceable optical unit 190 via the connecting member 49B and the joint cap 44C.

Moreover, the replaceable optical unit 190 may be connected to the body portion 191 by fixing the support member 44 to the housing 32 of the body portion 191 in a state in which the joint cap 44C and the connecting member 49B are engaged capable of transmitting a rotary motion. In this case, in the state in which the support member 44 is fixed to the housing 32 of the body portion 191, the lens holder body 44A may be configured to make a rotary motion inside the support member 44 via a sliding means such as a bearing. Note that, it is preferable that the additional configuration (such as a laser pointer and the like) is attached to the replaceable optical unit 190 in advance before the replaceable optical unit 190 is connected to the body portion 191.

As described above, in this embodiment, since the replaceable optical unit is employed, by selecting and attaching an appropriate unit according to a purpose (a type, a state, a size and the like of a matter to be treated), various irradiation modes of the laser beam can be realized. Specifically, by selecting a unit including a single wedge prism, the circular scanning as illustrated in FIG. 4 can be realized. By selecting a unit including two wedge prisms (with a rotation speed difference), the annular scanning as illustrated in FIG. 6 or FIG. 7 can be realized. By selecting a unit including two wedge prisms (no rotation speed difference), the circular scanning illustrated in FIG. 15 can be realized.

Furthermore, by selecting an appropriate unit in a plurality of units including wedge prisms with deflection angles different in steps, the circular scanning with a desired radius r according to a purpose can be realized. Moreover, various irradiation conditions may be changed by providing in the scanning optical system a focal distance of a deflection angle capable to be changed. For example, by changing the replaceable optical unit as appropriate to change the deflection angle, the size of the circular scanning (diameters 10 cm, 5 cm, 3 cm and the like, for example) can be changed with substantially the same inter-surface distance, and by changing the focal distance, the desired inter-surface distance is changed, and as a result, the size of the circular scanning (diameters 10 cm, 5 cm, 3 cm and the like, for example) can be also changed. Regarding the size of the circular scanning (diameters 10 cm, 5 cm, 3 cm and the like, for example), large-sized circular scanning may be used for a large area, while small-sized circular scanning may be used for a small area such as a narrow part in accordance with an area of the surface to be treated.

Moreover, when the laser beam with the same energy is to be irradiated, if the size of the circular scanning is changed, energy density at the irradiation position is also changed. Thus, the size of the circular scanning may be changed by selecting the replaceable optical unit in accordance with the desired energy density to be applied to the surface to be treated. Moreover, the energy density of the laser irradiation to be applied to the surface to be treated can be adjusted by changing the size of the circular scanning in accordance with a specified output of the laser oscillator to be used, and there is less concern that excessive energy is applied. Furthermore, the replaceable optical unit may be selected in accordance with the state of the surface to be treated, and if the Class 3 scraping for removing rusts on a surface layer or floating coating is to be performed, for example, the replaceable optical unit capable of large-sized circular scanning can be selected so that the energy density of the laser irradiation is made smaller. By using the replaceable optical unit as above, maintenance and service of the optical member is facilitated. Note that, to the laser head including the replaceable optical unit of this embodiment, too, the various attachments (reference numeral 5 illustrated in FIG. 1 or FIG. 11, reference character 5B illustrated in FIG. 8, reference character 5C illustrated in FIG. 10 and the like) can be attached.

Example 1

As an example of the present invention, a laser head was designed as follows. The laser head had a length of 43 cm, a diameter of 7 cm, and a weight of 1400 g. In the laser head having the first and second wedge prisms, a focal distance was set to 150 mm and a beam spot diameter at a focal point to 0.04 mm (40 µm). The laser beam entering the laser head is of a continuous oscillation type having an average output of 200 W and a wavelength of 1070 nm. The laser head attached with an attachment was brought into contact with a flat-plane shaped steel plate on which a coating with a thickness of 30 to 50 µm was formed, and the laser beam was irradiated to a surface of the steel plate substantially perpendicularly. By using such laser head, treatment of coating removal with work efficiency of 8 $m^2$ per hour was possible.

Example 2

Figure 20:
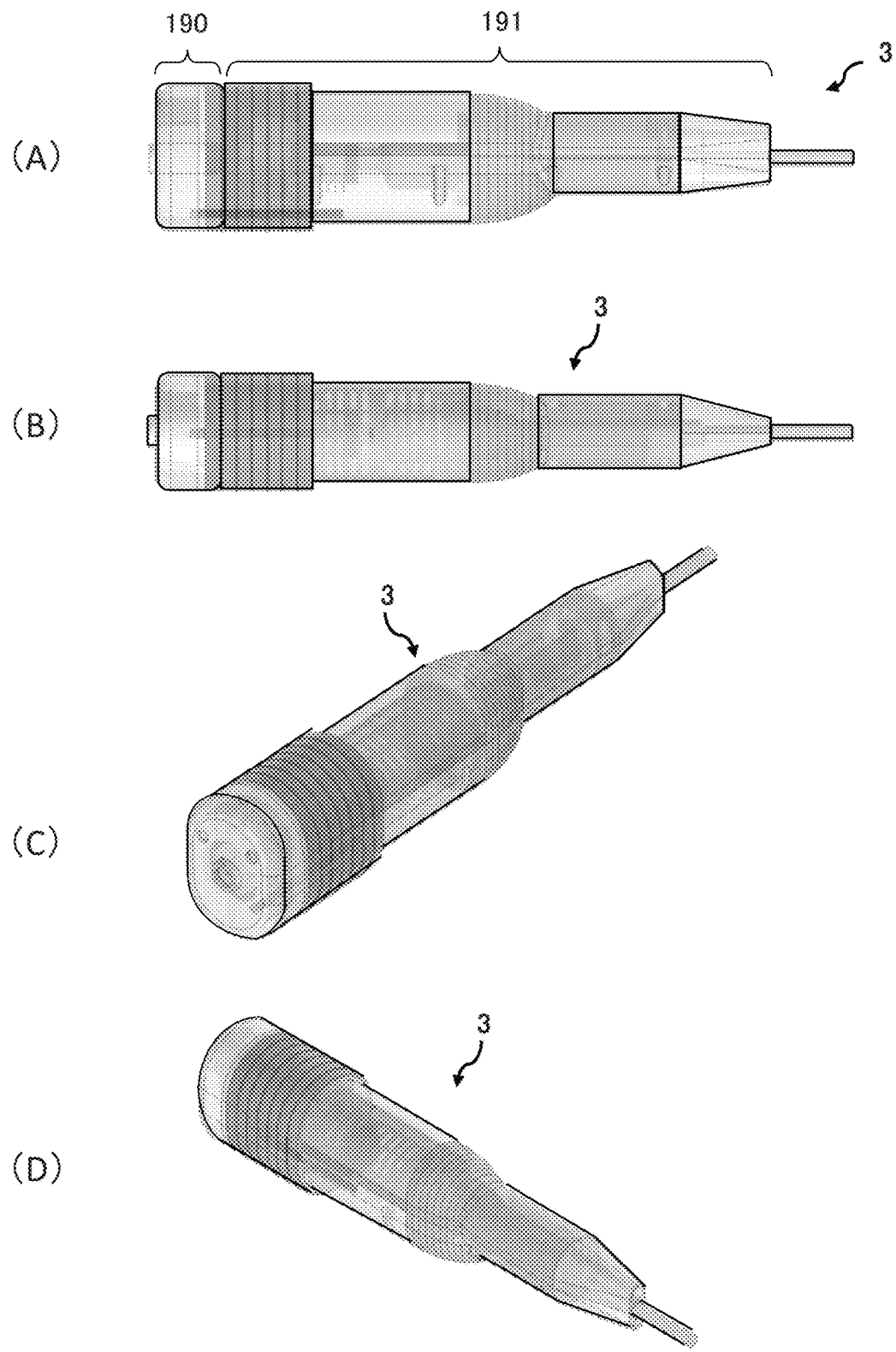
FIG. 20 are outline views (panels (A), (B), (C) and (D)) of an example of the laser head of the present invention.

Moreover, as another example of the present invention, a laser head for which the replaceable optical unit was employed was designed. FIG. 20 are appearance views of the example of the laser head for which the replaceable optical unit was employed. FIGS. 20(A), 20(B), 20(C), and 20(D) are a side view, a top view, a perspective view when seen from a tip-end side, and a perspective view when seen from a rear end side of such laser head, respectively. This laser head had a length of 35 cm, a height of 8.5 cm, a width of 6 cm, and a weight of 1.6 kg. The replaceable optical unit 190 included a light collecting lens, a wedge plate, and a protective glass (a part of a shielding member), was detachably attached to the body portion 191, and was connected so that a driving force can be transmitted via the driving means and the connecting member of the body portion 191.

By referring also to FIG. 19, the joint cap 44C of the replaceable optical unit 190 was connected to the connecting member 49B of the body portion 191, capable of transmitting a rotary motion, and a housing 44 itself on the outside of the replaceable optical unit 190 was fixed to the housing 32 of the body portion 191. The lens holder body 44A storing the optical member inside the replaceable optical unit 190 was configured so as to rotate along the inner side of the housing 44 of the replaceable optical unit 190 via a bearing. When the replaceable optical unit 190 is to be mounted to the body portion 191, the joint cap 44C is engaged with the connecting member 49B, and the replaceable optical unit 190 is inserted while being rotated in one direction. When the replaceable optical unit 190 is to be removed from the body portion 191, the replaceable optical unit 190 is pulled out while being rotated in a direction opposite to that in mounting. The replaceable optical unit 190 has a length of 4 cm, a height of 8.5 cm, and a width of 6 cm and if one wedge prism is included, the weight is 200 to 300 g.

As described above, according to each of the embodiments of the present invention, by scanning the laser irradiation point on the surface of the structure, a coating can be removed efficiently in a short time. Moreover, since the position of a focal point can be set as appropriate by the expansion/contraction mechanism of the attachment and the like, irradiation energy, a spot diameter and the like can be selected according to the state of the surface. According to the present invention, unlike the conventional blast treatment, since physical contact with the surface is not involved and a quiet laser is used, an influence of a noise to the ambient environment is small. Moreover, according to an aspect of the present invention, by employing the various attachments, a coating and an adhering matter at a complicated spot, a periphery of a protrusion, a narrow part, on an inside of a pipeline and the like where treatment has been difficult with the conventional method can be removed.

Note that the first to ninth embodiments have been explained, but the application range of the present invention is not limited by the respective embodiments. For example, a plurality of the embodiments may be combined or a part of the configuration of each of the embodiments (configurations of the attachment, the shielding member, the suctioning means, the scanning optical system, the laser pointer and its irradiation hole, the supply port of the gas supply means and the like) can be combined with each other.

REFERENCE NUMERALS

1 laser oscillator
2 fiber
3 laser head
4 scanning optical system
5 attachment
7 sensor group
9 suction source
11 gas supply source
20 surface
30 laser beam
31 suction means
32 housing
33 suction port
34 gas blow-out port
35 control unit
36 operating unit
48 shielding member
100 vehicle

What is claimed is:

1. A method for removing an adhering matter of a surface of a structure by laser irradiation from a laser irradiation apparatus for focusing a laser beam outputted from a laser oscillator and irradiating the laser beam to the surface of the structure, characterized in that:
the laser irradiation apparatus performs rotating an irradiation point of a focused laser beam on the surface of the structure, while the laser irradiation apparatus is moved with respect to the structure to keep a distance between the laser irradiation apparatus and the surface of the structure to be treated constant, wherein
the adhering matter of the surface of the structure is an adhering matter of a surface of an inside of a pipeline;
the laser beam is irradiated circularly in accordance with an inner diameter of the inside of the pipeline;
the laser irradiation apparatus is placed on a moving means capable of running the inside of the pipeline;
the moving means has a sealing means capable of close contact with the surface of the inside of the pipeline; and
the laser irradiation apparatus is movable with respect to the surface of the inside of the pipeline by the moving means while bringing into close contact the sealing means with the inside of the pipeline.

2. The method according to claim 1, characterized in that the laser irradiation apparatus performs a scanning in a predetermined direction while rotating so that the irradiation point of the focused laser beam draws a trajectory of a circle having a constant radius on the surface of the structure.

3. The method according to claim 1, characterized in that the laser irradiation apparatus has a deflecting means for deflecting the laser beam with respect to an optical axis of the focused laser beam at a predetermined angle, and the deflecting means rotates the focused laser beam around the optical axis so as to rotate the irradiation point of the focused laser beam on the surface of the structure.

4. The method according to claim 1, characterized by moving the laser irradiation apparatus with respect to the structure so that the irradiation point of the laser beam on the surface of the structure draws a trajectory of a circle having a radius within a range of 5 to 200 mm.

5. The method according to claim 1, characterized in that the laser irradiation apparatus has a laser head, and the laser head comprises:
the laser oscillator;
an optical system for focusing the laser beam outputted from the laser oscillator and irradiating the laser beam to the surface of the structure;
a shielding member for protecting the optical system from a removed matter generated from the surface of the structure; and
an emitting port provided in the shielding member and open to an optical path of the laser beam irradiated on the surface of the structure.

6. The method according to claim 1, characterized in that the laser irradiation apparatus is moved linearly with respect to the surface of the structure so as to remove the adhering matter of the surface of the structure.

7. The method according to claim 1, characterized in that the surface of the structure is kept within a range of 5 to 25 mm closer to the laser irradiation apparatus than a focal position of the laser beam.

8. The method according to claim 1, characterized in that a wavelength of the laser beam is 500 nm or more.

9. The method according to claim 1, characterized in that the sealing means prevents removed matters removed by the laser irradiation from scattering.

10. A method for removing an adhering matter of a surface of a structure by laser irradiation from a laser irradiation apparatus for focusing a laser beam outputted from a laser oscillator and irradiating the laser beam to the surface of the structure, characterized in that:

the laser irradiation apparatus has a first deflecting means for deflecting the laser beam with respect to an optical axis of the focused laser beam at a predetermined angle and a second deflecting means for deflecting the focused laser beam deflected by the first deflecting means at a predetermined angle; wherein an irradiation point of the focused laser beam through the second deflecting means is subjected to rotary scanning so as to draw a trajectory of a circle having a constant radius r2 around a circumference of a circle having a constant radius r1 on the surface of the structure;

the laser irradiation apparatus is moved with respect to the structure to keep a distance between the laser irradiation apparatus and the surface of the structure to be treated constant;

the adhering matter of the surface of the structure is an adhering matter of a surface of an inside of a pipeline;

the laser beam is irradiated circularly in accordance with an inner diameter of the inside of the pipeline;

the laser irradiation apparatus is placed on a moving means capable of running the inside of the pipeline;

the moving means has a sealing means capable of close contact with the surface of the inside of the pipeline; and the laser irradiation apparatus is movable with respect to the surface of the inside of the pipeline by the moving means while bringing into close contact the sealing means with the inside of the pipeline.

11. An apparatus for removing an adhering matter of a surface of a structure by laser irradiation from a laser irradiation apparatus for focusing a laser beam outputted from a laser oscillator and irradiating the laser beam to the surface of the structure, characterized in that:

the laser irradiation apparatus performs rotating an irradiation point of a focused laser beam on the surface of the structure, while the laser irradiation apparatus is moved with respect to the structure to keep a distance between the laser irradiation apparatus and the surface of the structure to be treated constant, wherein the adhering matter of the surface of the structure is an adhering matter of a surface of an inside of a pipeline;

the laser beam is irradiated circularly in accordance with an inner diameter of the inside of the pipeline;

the laser irradiation apparatus is placed on a moving means capable of running the inside of the pipeline;

the moving means has a sealing means capable of close contact with the surface of the inside of the pipeline; and the laser irradiation apparatus is movable with respect to the surface of the inside of the pipeline by the moving means while bringing into close contact the sealing means with the inside of the pipeline.

12. The apparatus according to claim 11, characterized in that the laser irradiation apparatus includes an optical system for performing a scanning in a predetermined direction while rotating so that the irradiation point of the focused laser beam draws a trajectory of a circle having a constant radius on the surface of the structure.

13. The apparatus according to claim 12, characterized in that the optical system has a deflecting means for deflecting the laser beam with respect to an optical axis of the focused laser beam at a predetermined angle, and the deflecting means rotates the focused laser beam around the optical axis so as to rotate the irradiation point of the focused laser beam on the surface of the structure.

14. The apparatus according to claim 12, characterized in that the laser irradiation apparatus is moved linearly with respect to the surface of the structure so as to remove the adhering matter of the surface of the structure.

15. The apparatus according to claim 12, characterized in that the laser irradiation apparatus has a laser head, and the laser head comprises:

a laser head body for accommodating the laser oscillator and a driving means for rotatively driving the optical system; and a replaceable optical unit capable of connecting to the laser head body, accommodating at least a part of the optical system, and having an emitting port of the laser beam irradiated from the optical system.

16. The apparatus according to claim 11, characterized by moving the laser irradiation apparatus with respect to the structure so that the irradiation point of the laser beam on the surface of the structure draws a trajectory of a circle having a radius within a range of 5 to 200 mm.

17. The apparatus according to claim 11, characterized in that the laser irradiation apparatus has a laser head, and the laser head comprises:

the laser oscillator;

an optical system for focusing the laser beam outputted from the laser oscillator and irradiating the laser beam to the surface of the structure;

a shielding member for protecting the optical system from a removed matter generated from the surface of the structure; and an emitting port provided in the shielding member and open to an optical path of the laser beam irradiated on the surface of the structure.

18. The apparatus according to claim 17, characterized in that the laser head includes an attachment for abutting on the surface of the structure and keeping a distance between the laser head and the surface of the structure to be treated constant.

19. The apparatus according to claim 18, characterized in that the attachment has an inner wall on the surface of the structure so as to reflect the laser beam irradiated from the laser head to the surface of the structure.

20. The apparatus according to claim 11, characterized in that a wavelength of the laser beam is 500 nm or more.

21. The apparatus according to claim 11, characterized in that the sealing means prevents removed matters removed by the laser irradiation from scattering.

22. A method for removing an adhering matter of a surface of a structure by laser irradiation from a laser irradiation apparatus for focusing a laser beam outputted from a laser oscillator and irradiating the laser beam to the surface of the structure, characterized in that:

the laser irradiation apparatus has an optical system comprising a first deflecting means for deflecting the laser beam with respect to an optical axis of the focused laser beam at a predetermined angle and a second deflecting means for deflecting the focused laser beam deflected by the first deflecting means at a predetermined angle; wherein an irradiation point of the focused laser beam through the second deflecting means is subjected to rotary scanning so as to draw a trajectory of a circle having a constant radius r2 around a circumference of a circle having a constant radius r1 on the surface of the structure;

the laser irradiation apparatus is moved with respect to the structure to keep a distance between the laser irradiation apparatus and the surface of the structure to be treated constant;

the adhering matter of the surface of the structure is an adhering matter of a surface of an inside of a pipeline;

the laser beam is irradiated circularly in accordance with an inner diameter of the inside of the pipeline;

the laser irradiation apparatus is placed on a moving means capable of running the inside of the pipeline;

the moving means has a sealing means capable of close contact with the surface of the inside of the pipeline; and the laser irradiation apparatus is movable with respect to the surface of the inside of the pipeline by the moving means while bringing into close contact the sealing means with the inside of the pipeline.

\* \* \* \* \*